(12) United States Patent
Schmisseur et al.

(10) Patent No.: US 10,917,321 B2
(45) Date of Patent: Feb. 9, 2021

(54) DISAGGREGATED PHYSICAL MEMORY RESOURCES IN A DATA CENTER

(71) Applicant: INTEL CORPORATION, Santa Clara, CA (US)

(72) Inventors: Mark A. Schmisseur, Phoenix, AZ (US); Bassam N. Coury, Dupont, WA (US)

(73) Assignee: INTEL CORPORATION, Santa Clara, CA (US)

( * ) Notice: Subject to any disclaimer, the term of this patent is extended or adjusted under 35 U.S.C. 154(b) by 99 days.

(21) Appl. No.: 15/476,910

(22) Filed: Mar. 31, 2017

(65) Prior Publication Data
US 2018/0027679 A1 Jan. 25, 2018

Related U.S. Application Data

(60) Provisional application No. 62/427,268, filed on Nov. 29, 2016, provisional application No. 62/376,859, (Continued)

(51) Int. Cl.
*H04L 12/26* (2006.01)
*G06F 16/901* (2019.01)
(Continued)

(52) U.S. Cl.
CPC ............ *H04L 43/08* (2013.01); *G02B 6/3882* (2013.01); *G02B 6/3893* (2013.01); *G02B 6/3897* (2013.01); *G02B 6/4292* (2013.01); *G02B 6/4452* (2013.01); *G06F 1/183* (2013.01); *G06F 1/20* (2013.01); *G06F 3/064* (2013.01); *G06F 3/0613* (2013.01); *G06F 3/0625* (2013.01); *G06F 3/0653* (2013.01); *G06F 3/0655* (2013.01); *G06F 3/0664* (2013.01); *G06F 3/0665* (2013.01); *G06F 3/0673* (2013.01); *G06F 3/0679* (2013.01); *G06F 3/0683* (2013.01); *G06F 3/0688* (2013.01); *G06F 3/0689* (2013.01); *G06F 8/65* (2013.01); *G06F 9/30036* (2013.01); *G06F 9/4401* (2013.01);
(Continued)

(58) Field of Classification Search
None
See application file for complete search history.

(56) References Cited

U.S. PATENT DOCUMENTS 8,850,091 B1 * 9/2014 Karamcheti ........ G06F 12/0246
710/62
10,216,596 B1 * 2/2019 Pudipeddi ........... G06F 13/4282
(Continued)

*Primary Examiner* — Henry Tsai
*Assistant Examiner* — Christopher A Bartels
(74) *Attorney, Agent, or Firm* — Kacvinsky Daisak Bluni PLLC

(57) ABSTRACT

Examples may include sleds for a rack in a data center including physical compute resources and memory for the physical compute resources. The memory can be disaggregated, or organized into near and far memory. A first sled can comprise the physical compute resources and a first set of physical memory resources while a second sled can comprise a second set of physical memory resources. The first set of physical memory resources can be coupled to the physical compute resources via a local interface while the second set of physical memory resources can be coupled to the physical compute resources via a fabric.

21 Claims, 17 Drawing Sheets

Related U.S. Application Data filed on Aug. 18, 2016, provisional application No. 62/365,969, filed on Jul. 22, 2016.

(51) Int. Cl.

| | | |
|---|---|---|
| *H04B 10/25* | (2013.01) | |
| *G02B 6/38* | (2006.01) | |
| *G06F 1/20* | (2006.01) | |
| *G11C 5/06* | (2006.01) | |
| *G02B 6/42* | (2006.01) | |
| *G02B 6/44* | (2006.01) | |
| *G06F 1/18* | (2006.01) | |
| *G06F 3/06* | (2006.01) | |
| *G06F 8/65* | (2018.01) | |
| *G06F 9/30* | (2018.01) | |
| *G06F 9/4401* | (2018.01) | |
| *G06F 9/54* | (2006.01) | |
| *G06F 12/109* | (2016.01) | |
| *G06F 12/14* | (2006.01) | |
| *G06F 13/16* | (2006.01) | |
| *G06F 13/40* | (2006.01) | |
| *G08C 17/02* | (2006.01) | |
| *G11C 5/02* | (2006.01) | |
| *G11C 7/10* | (2006.01) | |
| *G11C 11/56* | (2006.01) | |
| *G11C 14/00* | (2006.01) | |
| *H03M 7/30* | (2006.01) | |
| *H03M 7/40* | (2006.01) | |
| *H04L 12/24* | (2006.01) | |
| *H04L 12/931* | (2013.01) | |
| *H04L 12/947* | (2013.01) | |
| *H04L 29/08* | (2006.01) | |
| *H04L 29/06* | (2006.01) | |
| *H04Q 11/00* | (2006.01) | |
| *H05K 7/14* | (2006.01) | |
| *G06F 9/38* | (2018.01) | |
| *G06F 9/50* | (2006.01) | |
| *H04L 12/811* | (2013.01) | |
| *H05K 5/02* | (2006.01) | |
| *H04W 4/80* | (2018.01) | |
| *G06Q 10/08* | (2012.01) | |
| *G06Q 10/00* | (2012.01) | |
| *G06Q 50/04* | (2012.01) | |
| *H04L 12/911* | (2013.01) | |
| *B25J 15/00* | (2006.01) | |
| *B65G 1/04* | (2006.01) | |
| *H05K 7/20* | (2006.01) | |
| *H04L 12/939* | (2013.01) | |
| *H04W 4/02* | (2018.01) | |
| *H04L 12/751* | (2013.01) | |
| *G06F 13/42* | (2006.01) | |
| *H05K 1/18* | (2006.01) | |
| *G05D 23/19* | (2006.01) | |
| *G05D 23/20* | (2006.01) | |
| *H04L 12/927* | (2013.01) | |
| *H05K 1/02* | (2006.01) | |
| *H04L 12/781* | (2013.01) | |
| *H04Q 1/04* | (2006.01) | |
| *G06F 12/0893* | (2016.01) | |
| *H05K 13/04* | (2006.01) | |
| *G06F 11/14* | (2006.01) | |
| *G06F 11/34* | (2006.01) | |
| *G06F 12/0862* | (2016.01) | |
| *G06F 15/80* | (2006.01) | |
| *H04L 12/919* | (2013.01) | |
| *G06F 12/10* | (2016.01) | |
| *G06Q 10/06* | (2012.01) | |
| *G07C 5/00* | (2006.01) | |
| *H04L 12/28* | (2006.01) | |
| *H04L 29/12* | (2006.01) | |
| *H04L 9/06* | (2006.01) | |
| *H04L 9/14* | (2006.01) | |
| *H04L 9/32* | (2006.01) | |
| *H04L 12/933* | (2013.01) | |

(52) U.S. Cl.
CPC ............ *G06F 9/544* (2013.01); *G06F 12/109* (2013.01); *G06F 12/1408* (2013.01); *G06F 13/1668* (2013.01); *G06F 13/409* (2013.01); *G06F 13/4068* (2013.01); *G06F 16/9014* (2019.01); *G08C 17/02* (2013.01); *G11C 5/02* (2013.01); *G11C 7/1072* (2013.01); *G11C 11/56* (2013.01); *G11C 14/0009* (2013.01); *H03M 7/3086* (2013.01); *H03M 7/4056* (2013.01); *H03M 7/4081* (2013.01); *H04B 10/25891* (2020.05); *H04L 41/145* (2013.01); *H04L 43/0817* (2013.01); *H04L 43/0876* (2013.01); *H04L 43/0894* (2013.01); *H04L 49/00* (2013.01); *H04L 49/25* (2013.01); *H04L 49/357* (2013.01); *H04L 49/45* (2013.01); *H04L 67/02* (2013.01); *H04L 67/306* (2013.01); *H04L 69/04* (2013.01); *H04L 69/329* (2013.01); *H04Q 11/0003* (2013.01); *H05K 7/1442* (2013.01); *B25J 15/0014* (2013.01); *B65G 1/0492* (2013.01); *G05D 23/1921* (2013.01); *G05D 23/2039* (2013.01); *G06F 3/061* (2013.01); *G06F 3/067* (2013.01); *G06F 3/0611* (2013.01); *G06F 3/0616* (2013.01); *G06F 3/0619* (2013.01); *G06F 3/0631* (2013.01); *G06F 3/0638* (2013.01); *G06F 3/0647* (2013.01); *G06F 3/0658* (2013.01); *G06F 3/0659* (2013.01); *G06F 9/3887* (2013.01); *G06F 9/505* (2013.01); *G06F 9/5016* (2013.01); *G06F 9/5044* (2013.01); *G06F 9/5072* (2013.01); *G06F 9/5077* (2013.01); *G06F 11/141* (2013.01); *G06F 11/3414* (2013.01); *G06F 12/0862* (2013.01); *G06F 12/0893* (2013.01); *G06F 12/10* (2013.01); *G06F 13/161* (2013.01); *G06F 13/1694* (2013.01); *G06F 13/4022* (2013.01); *G06F 13/42* (2013.01); *G06F 13/4282* (2013.01); *G06F 15/8061* (2013.01); *G06F 2209/5019* (2013.01); *G06F 2209/5022* (2013.01); *G06F 2212/1008* (2013.01); *G06F 2212/1024* (2013.01); *G06F 2212/1041* (2013.01); *G06F 2212/1044* (2013.01); *G06F 2212/152* (2013.01); *G06F 2212/202* (2013.01); *G06F 2212/401* (2013.01); *G06F 2212/402* (2013.01); *G06F 2212/7207* (2013.01); *G06Q 10/06* (2013.01); *G06Q 10/06314* (2013.01); *G06Q 10/087* (2013.01); *G06Q 10/20* (2013.01); *G06Q 50/04* (2013.01); *G07C 5/008* (2013.01); *G08C 2200/00* (2013.01); *G11C 5/06* (2013.01); *H03M 7/30* (2013.01); *H03M 7/3084* (2013.01); *H03M 7/40* (2013.01); *H03M 7/6005* (2013.01); *H03M 7/6023* (2013.01); *H04B 10/25* (2013.01); *H04L 9/0643* (2013.01); *H04L 9/14* (2013.01); *H04L 9/3247* (2013.01); *H04L 9/3263* (2013.01); *H04L 12/2809* (2013.01); *H04L 29/12009*

(2013.01); *H04L 41/024* (2013.01); *H04L 41/046* (2013.01); *H04L 41/082* (2013.01); *H04L 41/0813* (2013.01); *H04L 41/0896* (2013.01); *H04L 41/12* (2013.01); *H04L 41/147* (2013.01); *H04L 41/5019* (2013.01); *H04L 43/065* (2013.01); *H04L 43/16* (2013.01); *H04L 45/02* (2013.01); *H04L 45/52* (2013.01); *H04L 47/38* (2013.01); *H04L 47/765* (2013.01); *H04L 47/782* (2013.01); *H04L 47/805* (2013.01); *H04L 47/82* (2013.01); *H04L 47/823* (2013.01); *H04L 49/15* (2013.01); *H04L 49/555* (2013.01); *H04L 67/10* (2013.01); *H04L 67/1004* (2013.01); *H04L 67/1008* (2013.01); *H04L 67/1012* (2013.01); *H04L 67/1014* (2013.01); *H04L 67/1029* (2013.01); *H04L 67/1034* (2013.01); *H04L 67/1097* (2013.01); *H04L 67/12* (2013.01); *H04L 67/16* (2013.01); *H04L 67/34* (2013.01); *H04Q 1/04* (2013.01); *H04Q 11/00* (2013.01); *H04Q 11/0005* (2013.01); *H04Q 11/0062* (2013.01); *H04Q 11/0071* (2013.01); *H04Q 2011/0037* (2013.01); *H04Q 2011/0041* (2013.01); *H04Q 2011/0052* (2013.01); *H04Q 2011/0073* (2013.01); *H04Q 2011/0079* (2013.01); *H04Q 2011/0086* (2013.01); *H04Q 2213/13523* (2013.01); *H04Q 2213/13527* (2013.01); *H04W 4/023* (2013.01); *H04W 4/80* (2018.02); *H05K 1/0203* (2013.01); *H05K 1/181* (2013.01); *H05K 5/0204* (2013.01); *H05K 7/1418* (2013.01); *H05K 7/1421* (2013.01); *H05K 7/1422* (2013.01); *H05K 7/1447* (2013.01); *H05K 7/1461* (2013.01); *H05K 7/1485* (2013.01); *H05K 7/1487* (2013.01); *H05K 7/1489* (2013.01); *H05K 7/1491* (2013.01); *H05K 7/1492* (2013.01); *H05K 7/1498* (2013.01); *H05K 7/2039* (2013.01); *H05K 7/20709* (2013.01); *H05K 7/20727* (2013.01); *H05K 7/20736* (2013.01); *H05K 7/20745* (2013.01); *H05K 7/20836* (2013.01); *H05K 13/0486* (2013.01); *H05K 2201/066* (2013.01); *H05K 2201/10121* (2013.01); *H05K 2201/10159* (2013.01); *H05K 2201/10189* (2013.01); *Y02D 10/00* (2018.01); *Y02P 90/30* (2015.11); *Y04S 10/50* (2013.01); *Y04S 10/52* (2013.01); *Y10S 901/01* (2013.01)

(56) References Cited

U.S. PATENT DOCUMENTS

| | | | | |
|---|---|---|---|---|
| 10,241,906 | B1* | 3/2019 | Robillard | G06F 12/0873 |
| 2003/0043816 | A1* | 3/2003 | Mitchem | H04L 45/54 370/395.31 |
| 2003/0091267 | A1* | 5/2003 | Alvarez | H04Q 11/0005 385/16 |
| 2004/0208171 | A1* | 10/2004 | Ovadia | H04Q 11/0066 370/360 |
| 2007/0088974 | A1* | 4/2007 | Chandwani | G06F 11/0781 714/6.11 |
| 2009/0138732 | A1* | 5/2009 | Chang | H04B 3/54 713/300 |
| 2010/0257294 | A1* | 10/2010 | Regnier | G06F 13/4022 710/105 |
| 2011/0055276 | A1* | 3/2011 | Hamilton | H04L 41/0893 707/784 |
| 2013/0089089 | A1* | 4/2013 | Kamath | H04L 12/413 370/358 |
| 2013/0198312 | A1* | 8/2013 | Tamir | G06F 15/167 709/212 |
| 2013/0215754 | A1* | 8/2013 | Tripathi | H04L 69/22 370/236 |
| 2013/0325998 | A1* | 12/2013 | Hormuth | G06F 15/17331 709/212 |
| 2015/0067084 | A1* | 3/2015 | Yeh | G06F 11/2007 709/209 |
| 2016/0156999 | A1* | 6/2016 | Liboiron-Ladouceur | H04Q 11/0005 398/51 |
| 2016/0283221 | A1* | 9/2016 | Kochar | G06F 9/45558 |
| 2017/0090510 | A1* | 3/2017 | Tennant | G06F 1/12 |
| 2018/0225230 | A1* | 8/2018 | Litichever | G06F 21/56 |
| 2019/0138457 | A1* | 5/2019 | Kumar | G06F 3/0629 |

* cited by examiner

DISAGGREGATED PHYSICAL MEMORY RESOURCES IN A DATA CENTER

RELATED CASE

This application claims priority to United States Provisional patent application entitled "Framework and Techniques for Pools of Configurable Computing Resources" filed on Nov. 29, 2016 and assigned Ser. No. 62/427,268; United States Provisional patent application entitled "Scalable System Framework Prime (SSFP) Omnibus Provisional II" filed on Aug. 18, 2016 and assigned Ser. No. 62/376,859; and United States Provisional patent application entitled "Framework and Techniques for Pools of Configurable Computing Resources" filed on Jul. 22, 2016 and assigned Ser. No. 62/365,969, each of which is hereby incorporated by reference in their entirety.

TECHNICAL FIELD

Embodiments described herein generally relate to data centers and particularly to memory resources within a data center.

BACKGROUND

Advancements in networking have enabled the rise in pools of physical resources. A pool of physical resources may be formed from a physical infrastructure including disaggregate physical resources, such as, for example, compute and storage resources found in large data centers. The physical infrastructure can include a number of computing systems having processors, memory, storage, networking, power, cooling, etc. Management entities of these data centers can aggregate a selection of the physical resources to form servers and/or physical computing hosts. These hosts can subsequently be allocated to execute system SW (e.g., OSs, VMMs, or the like) and host containers, VMs, and/or applications.

DETAILED DESCRIPTION

Data centers may generally be composed of a large number of racks that can contain numerous types of hardware or configurable resources (e.g., processing units, memory, storage, accelerators, networking, fans/cooling modules, power units, etc.). The types of hardware or configurable resources deployed in data centers may also be referred to as physical resources or disaggregate elements. It is to be appreciated, that the size and number of physical resources within a data center can be large, for example, on the order of hundreds of thousands of physical resources. Furthermore, these physical resources can be pooled to form virtual computing platforms for a large number and variety of computing tasks.

As noted, some of the physical resources can be compute resources (e.g., central processing units, or the like) or accelerator resources (e.g., application specific integrated circuits, field-programmable gate arrays, or the like). Furthermore, the physical resources include memory.

The present disclosure provides a disaggregated memory architecture for compute and/or accelerator resources in a data center. For example, the present disclosure provides a sled for a data center comprising a number of compute resources, a first quantity of physical resource memory coupled to the compute resources via a first interface and a second quantity of physical resource memory coupled to the compute resources via a second interface. In general, the first interface can be "faster" (e.g., lower latency, greater bandwidth, or the like) than the second interface. As such, the first quantity of memory can be referred to as "near memory" while the second quantity of memory can be referred to as "far memory."

It is noted, that the terms "near" and "far" may not imply a physical or geographic distance between the memories and the compute resources. Instead, the terms "near" and "far" are intended to imply a speed, latency, bandwidth, or the like of the memory resources. For example, near memory can be faster (e.g., lower latency, greater operating frequency, higher bandwidth, or the like) than far memory. In some examples, near memory may be faster than far memory due to the type of memories (e.g., near memory can be a different type of memory than far memory) or due to the interconnects between the compute and/or accelerator resources and the memory resources.

This is described in greater detail below. However, first, a general description of a data center in which the physical resources (e.g., compute resources, accelerator resources or the like) with shared memory can be implemented is described. In particular, FIGS. 1 to 10 describe data centers, racks, and sleds according to examples of the present disclosure. FIGS. 11 to 15 describe arrangements of physical compute resources and near and far memory, according to examples of the present disclosure.

Figure 1:
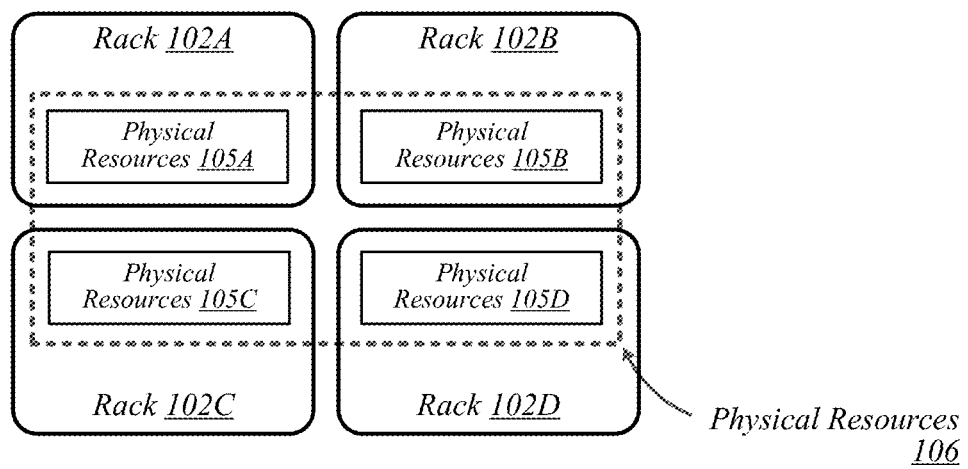
FIG. 1 illustrates a first example data center.

FIG. 1 illustrates a conceptual overview of a data center 100 that may generally be representative of a data center or other type of computing network in/for which one or more techniques described herein may be implemented according to various embodiments. As shown in this figure, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), graphics processing units (GPUs), memory, interconnect components, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical printed circuit boards (PCBs). In other words, the sleds are shorter from the front to the back, where cooling fans are located. This decreases the length of the path that air must to travel across the components on the PCB. Further, the components on the sled are spaced further apart than in typical PCBs, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. It is noted, that a DIMM can comprise volatile memory modules, non-volatile memory modules, or a combination of both. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures which may be in accordance to standards, such as Institute of Electrical and Electronics Engineers (IEEE) 802.3-2015 standard (Ethernet) or any predecessors, revisions, or variants thereof, and other architectures, such as Intel® Omni-Path®. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, field programmable gate arrays (FPGAs), application specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A to 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in some embodiments, the racks 102A to 102D include integrated power sources that receive a greater voltage than is typical for power sources. The increased voltage enables the power sources to provide additional power to the components on each sled, enabling the components to operate at higher than typical frequencies.

Figure 2:
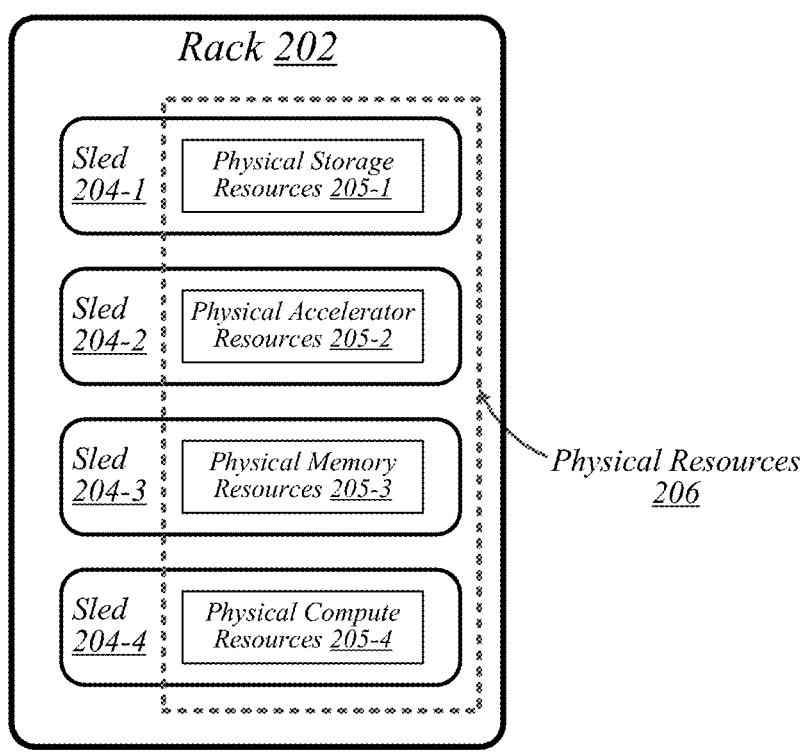
FIG. 2 illustrates a first example rack of a data center.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in this figure, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources 205-1 to 205-4 comprised in the sleds 204-1 to 204-4 of rack 202. As depicted in this illustrative embodiment, physical resources 205-1 to 205-4 include physical storage resources 205-1, physical accelerator resources 205-2, physical memory resources 205-3, and physical compute resources 205-4. The embodiments are not limited to this example. Each sled may contain a pool of each of the various types of physical resources (e.g., compute, memory, accelerator, storage). By having robotically accessible and robotically-manipulatable sleds comprising disaggregated resources, each type of resource can be upgraded independently of each other and at their own optimized refresh rate.

Groups of the physical accelerator resources 205-2 can share memory, as described in greater detail below, for example, with reference to FIGS. 11-14. Furthermore, it is noted, the number of sleds 204-1 to 204-4 and the arrangement (e.g., column, row, etc.) is depicted at a quantity and in an arrangement to facilitate understanding. However, examples are not limited in these contexts.

Figure 3:
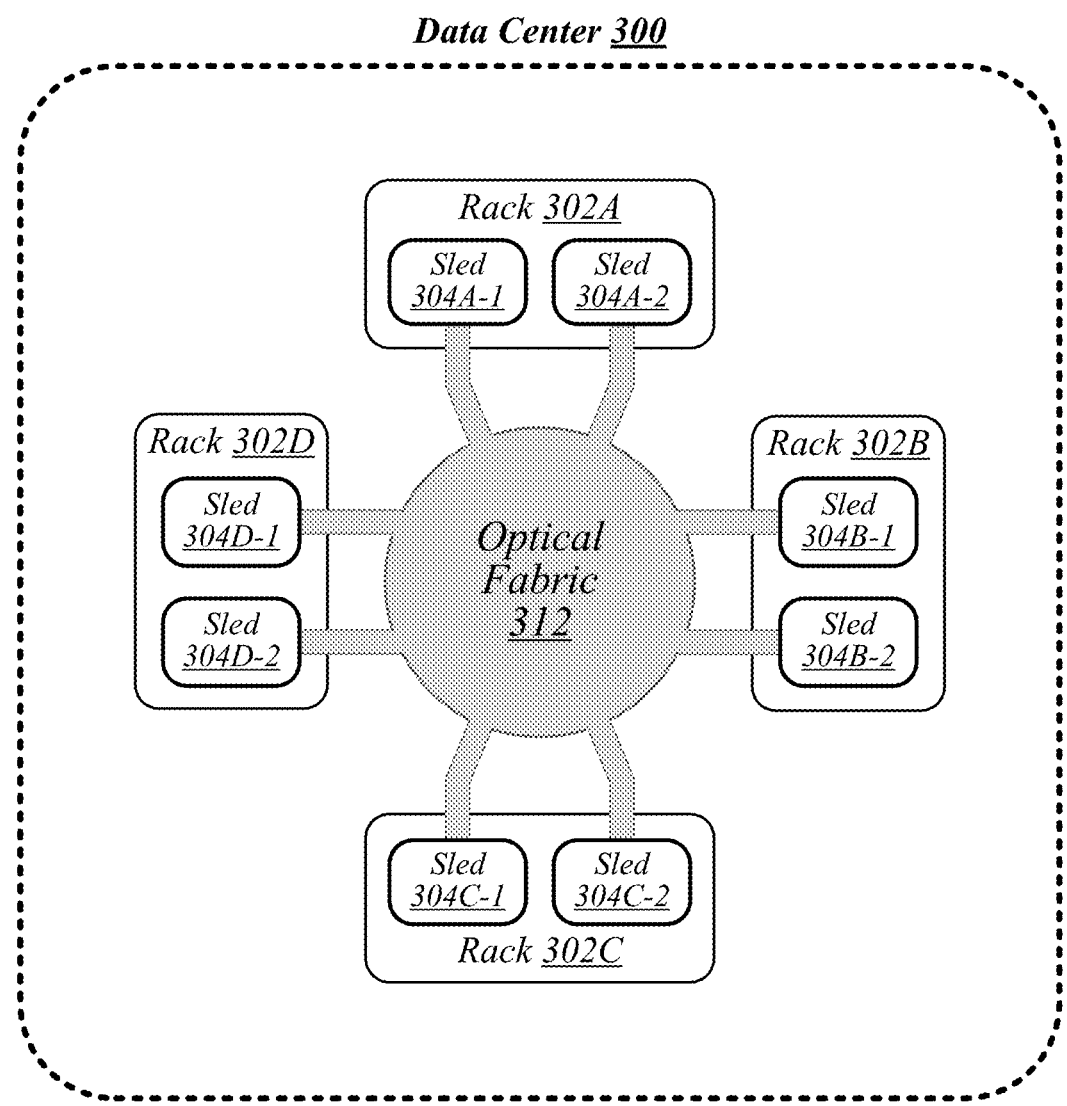
FIG. 3 illustrates a second example data center.

FIG. 3 illustrates an example of a data center 300 that may generally be representative of one in/for which one or more techniques described herein may be implemented according to various embodiments. As shown in this figure, data center 300 may feature an optical fabric 312. Optical fabric 312 may generally comprise a combination of optical signaling media (such as optical cabling) and optical switching infrastructure via which any particular sled in data center 300 can send signals to (and receive signals from) each of the other sleds in data center 300. The signaling connectivity that optical fabric 312 provides to any given sled may include connectivity both to other sleds in a same rack and sleds in other racks.

In the particular non-limiting example depicted here, data center 300 includes four racks 302A to 302D. Racks 302A to 302D house respective pairs of sleds 304A-1 and 304A-2, 304B-1 and 304B-2, 304C-1 and 304C-2, and 304D-1 and 304D-2. Thus, in this example, data center 300 comprises a total of eight sleds. Via optical fabric 312, each such sled may possess signaling connectivity with each of the seven other sleds in data center 300. For example, via optical fabric 312, sled 304A-1 in rack 302A may possess signaling connectivity with sled 304A-2 in rack 302A, as well as the six other sleds 304B-1, 304B-2, 304C-1, 304C-2, 304D-1, and 304D-2 that are distributed among the other racks 302B, 302C, and 302D of data center 300.

Figure 4:
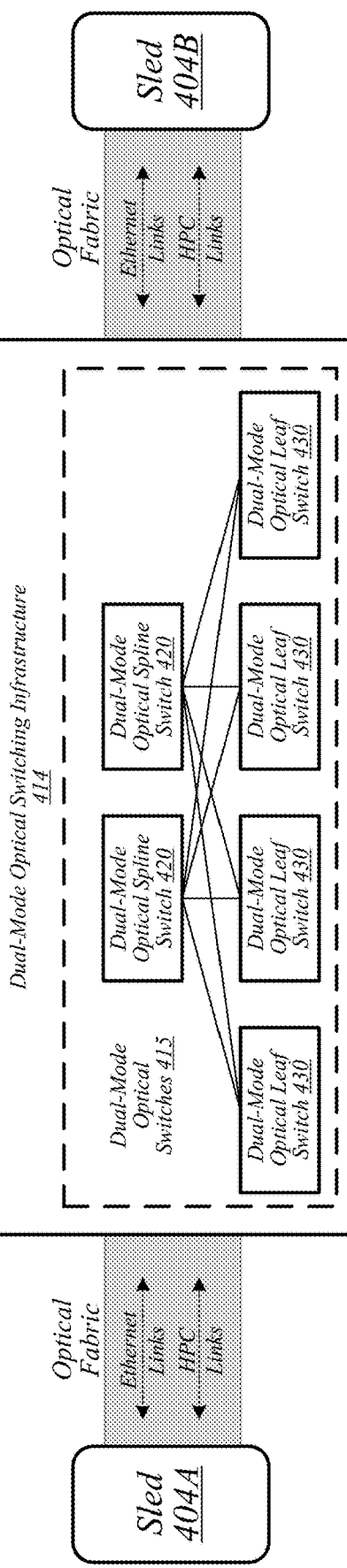
FIG. 4 illustrates a data center connectivity scheme.

FIG. 4 illustrates an overview of a connectivity scheme 400 that may generally be representative of link-layer connectivity that may be established in some embodiments among the various sleds of a data center, such as any of example data centers 100 and 300 of FIGS. 1 and 3.

Connectivity scheme 400 may be implemented using an optical fabric that features a dual-mode optical switching infrastructure 414. Dual-mode optical switching infrastructure 414 may generally comprise a switching infrastructure that is capable of receiving communications according to multiple link-layer protocols via a same unified set of optical signaling media, and properly switching such communications. In various embodiments, dual-mode optical switching infrastructure 414 may be implemented using one or more dual-mode optical switches 415. In various embodiments, dual-mode optical switches 415 may generally comprise high-radix switches. In some embodiments, dual-mode optical switches 415 may comprise multi-ply switches, such as four-ply switches. In various embodiments, dual-mode optical switches 415 may feature integrated silicon photonics that enable them to switch communications with significantly reduced latency in comparison to conventional switching devices. In some embodiments, dual-mode optical switches 415 may constitute leaf switches 430 in a leaf-spine architecture additionally including one or more dual-mode optical spine switches 420.

In various embodiments, dual-mode optical switches may be capable of receiving both Ethernet protocol communications carrying Internet Protocol (IP packets) and communications according to a second, high-performance computing (HPC) link-layer protocol (e.g., Intel® Omni-Path Architecture®, Infiniband®, or the like) via optical signaling media of an optical fabric. As reflected in this figure, with respect to any particular pair of sleds 404A and 404B possessing optical signaling connectivity to the optical fabric, connectivity scheme 400 may thus provide support for link-layer connectivity via both Ethernet links and HPC links. Thus, both Ethernet and HPC communications can be supported by a single high-bandwidth, low-latency switch fabric. The embodiments are not limited to this example.

Figure 5:
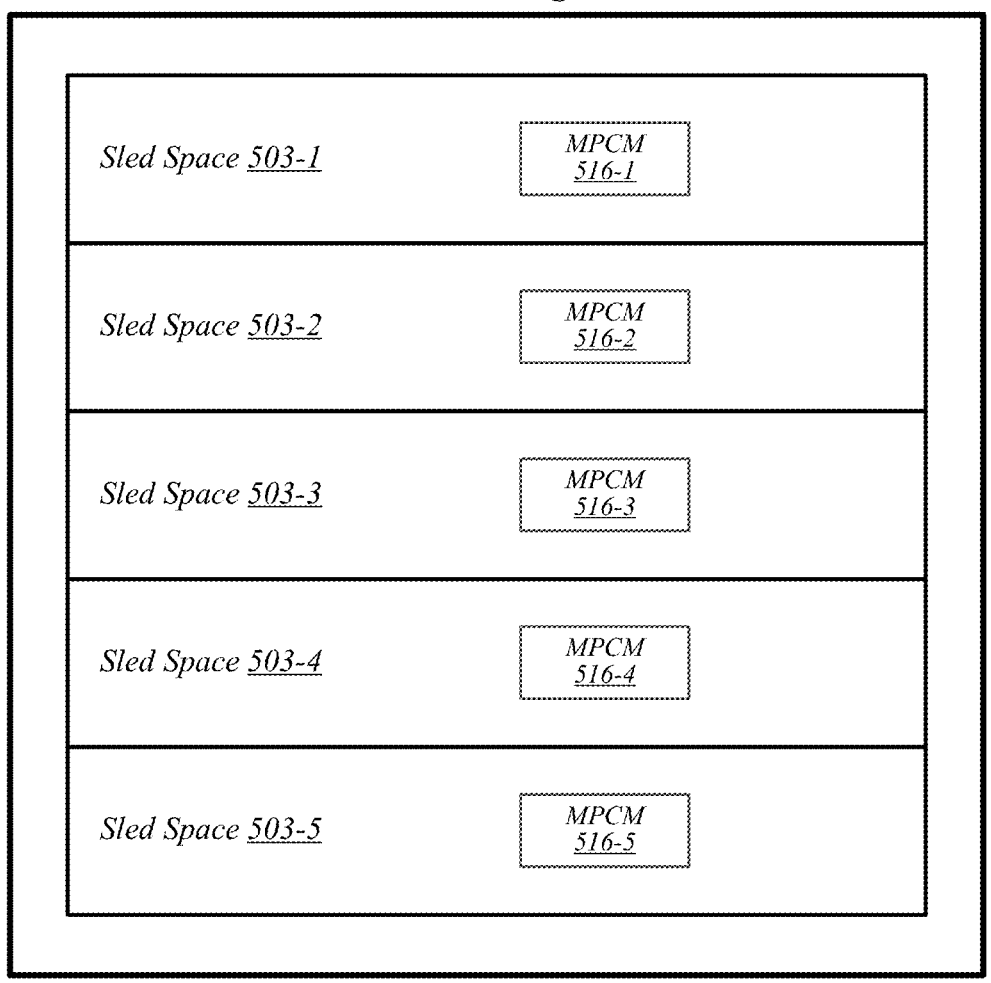
FIG. 5 illustrates a second example rack.

FIG. 5 illustrates a general overview of a rack architecture 500 that may be representative of an architecture of any particular one of the racks depicted herein. As reflected in this figure, rack architecture 500 may generally feature a plurality of sled spaces (or sled bays) into which sleds may be inserted, each of which may be robotically-accessible via a rack access region 501. In this particular non-limiting example, rack architecture 500 features five sled spaces 503-1 to 503-5. Sled spaces 503-1 to 503-5 feature respective multi-purpose connector modules (MPCMs) 516-1 to 516-5. When a sled is inserted into any given one of sled spaces 503-1 to 503-5, the corresponding MPCM may couple with a counterpart MPCM of the inserted sled. This coupling may provide the inserted sled with connectivity to both signaling infrastructure and power infrastructure of the rack in which it is housed.

Figure 6:
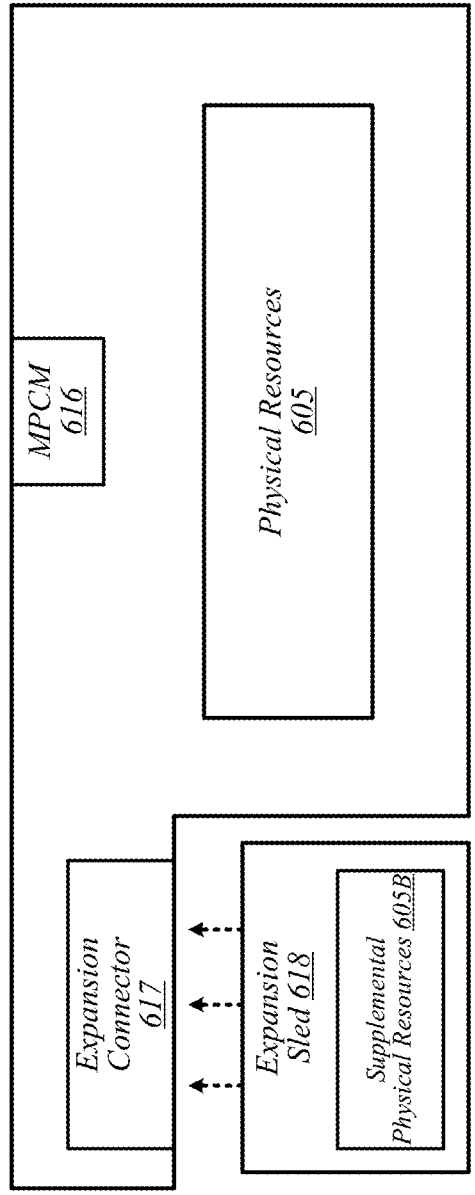
FIG. 6 illustrates a first example sled.

Included among the types of sleds to be accommodated by rack architecture 500 may be one or more types of sleds that feature expansion capabilities. FIG. 6 illustrates an example of a sled 604 that may be representative of a sled of such a type. As shown in this figure, sled 604 may comprise a set of physical resources 605, as well as an MPCM 616 designed to couple with a counterpart MPCM when sled 604 is inserted into a sled space such as any of sled spaces 503-1 to 503-5 of FIG. 5.

Sled 604 may also feature an expansion connector 617. Expansion connector 617 may generally comprise a socket, slot, or other type of connection element that is capable of accepting one or more types of expansion modules, such as an expansion sled 618. By coupling with a counterpart connector on expansion sled 618, expansion connector 617 may provide physical resources 605 with access to supplemental computing resources 605B residing on expansion sled 618. The embodiments are not limited in this context. In some examples, expansion sled 618 can comprise physical accelerator resources (e.g., comprising FPGAs, GPUs, memory, or a combination of FPGAs, GPUs, and memory.

Figure 7:
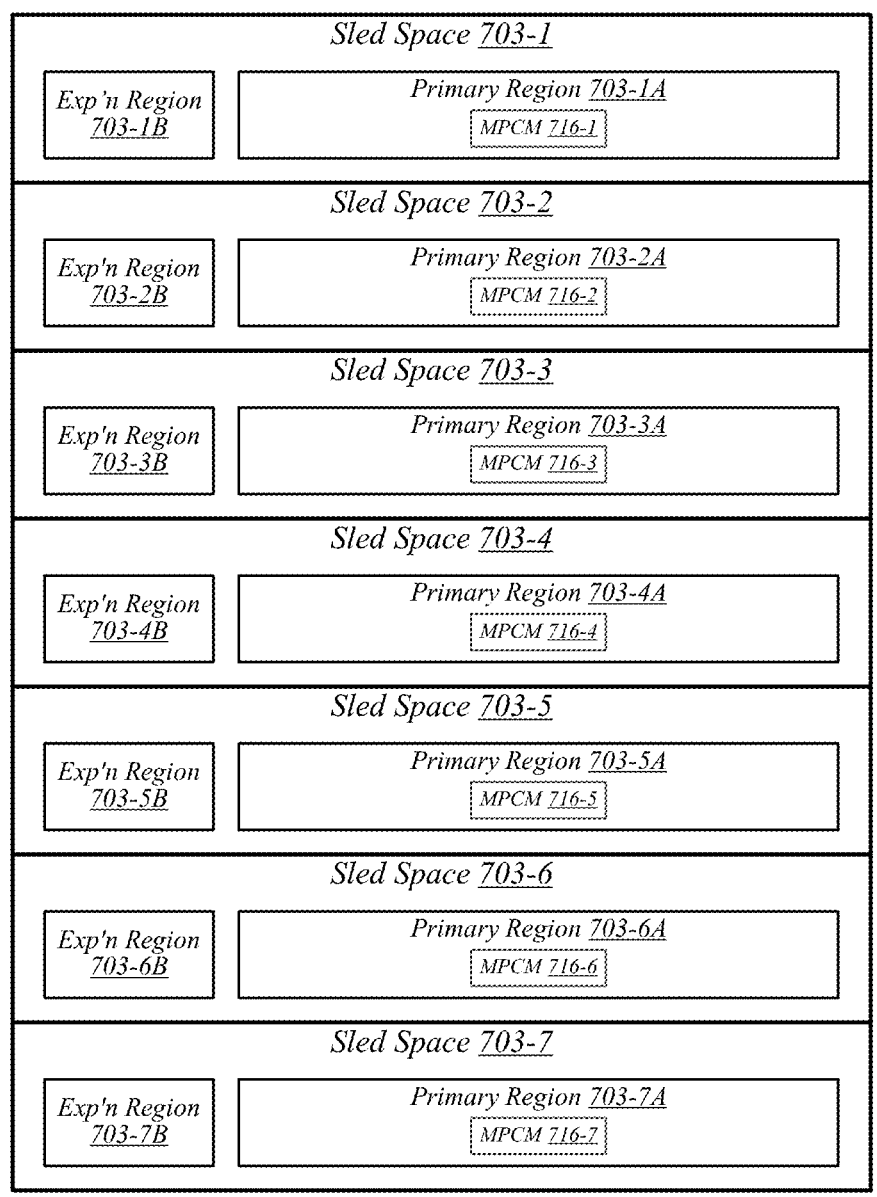
FIG. 7 illustrates a third example rack.

FIG. 7 illustrates an example of a rack architecture 700 that may be representative of a rack architecture that may be implemented in order to provide support for sleds featuring expansion capabilities, such as sled 604 of FIG. 6. In the particular non-limiting example depicted in FIG. 7, rack architecture 700 includes seven sled spaces 703-1 to 703-7, which feature respective MPCMs 716-1 to 716-7. Sled spaces 703-1 to 703-7 include respective primary regions 703-1A to 703-7A and respective expansion regions 703-1B to 703-7B.

With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 618 of FIG. 6, in the event that the inserted sled is configured with such a module.

Figure 8:
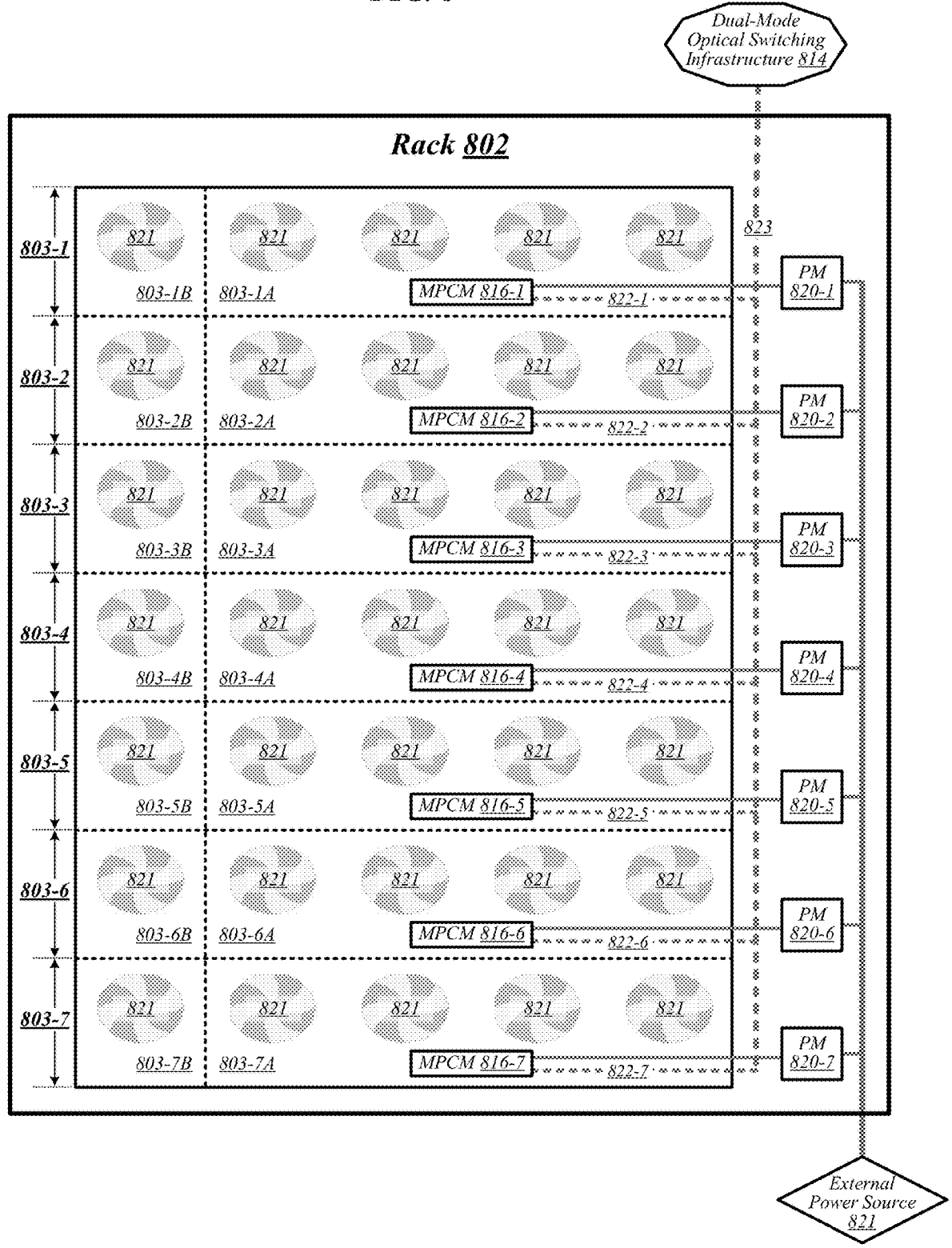
FIG. 8 illustrates a fourth example rack.

FIG. 8 illustrates an example of a rack 802 that may be representative of a rack implemented according to rack architecture 700 of FIG. 7 according to some embodiments. In the particular non-limiting example depicted in FIG. 8, rack 802 features seven sled spaces 803-1 to 803-7, which include respective primary regions 803-1A to 803-7A and respective expansion regions 803-1B to 803-7B. In various embodiments, temperature control in rack 802 may be implemented using an air cooling system. For example, as reflected in FIG. 8, rack 802 may feature a plurality of fans 819 that are generally arranged to provide air cooling within the various sled spaces 803-1 to 803-7. In some embodiments, the height of the sled space is greater than the conventional "1 U" server height. In such embodiments, fans 819 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 816-1 to 816-7 may be configured to provide inserted sleds with access to power sourced by respective power modules 820-1 to 820-7, each of which may draw power from an external power source 821. In various embodiments, external power source 821 may deliver alternating current (AC) power to rack 802, and power modules 820-1 to 820-7 may be configured to convert such AC power to direct current (DC) power to be sourced to inserted sleds. In some embodiments, for example, power modules 820-1 to 820-7 may be configured to convert 277-volt AC power into 12-volt DC power for provision to inserted sleds via respective MPCMs 816-1 to 816-7. The embodiments are not limited to this example.

MPCMs 816-1 to 816-7 may also be arranged to provide inserted sleds with optical signaling connectivity to a dual-mode optical switching infrastructure 814, which may be the same as—or similar to—dual-mode optical switching infrastructure 414 of FIG. 4. In various embodiments, optical connectors contained in MPCMs 816-1 to 816-7 may be designed to couple with counterpart optical connectors contained in MPCMs of inserted sleds to provide such sleds with optical signaling connectivity to dual-mode optical switching infrastructure 814 via respective lengths of optical cabling 822-1 to 822-7. In some embodiments, each such length of optical cabling may extend from its corresponding MPCM to an optical interconnect loom 823 that is external to the sled spaces of rack 802. In various embodiments, optical interconnect loom 823 may be arranged to pass through a support post or other type of load-bearing element of rack 802. Because inserted sleds connect to an optical switching infrastructure via MPCMs, the resources typically spent in manually configuring the rack cabling to accommodate a newly inserted sled can be saved.

Figure 9:
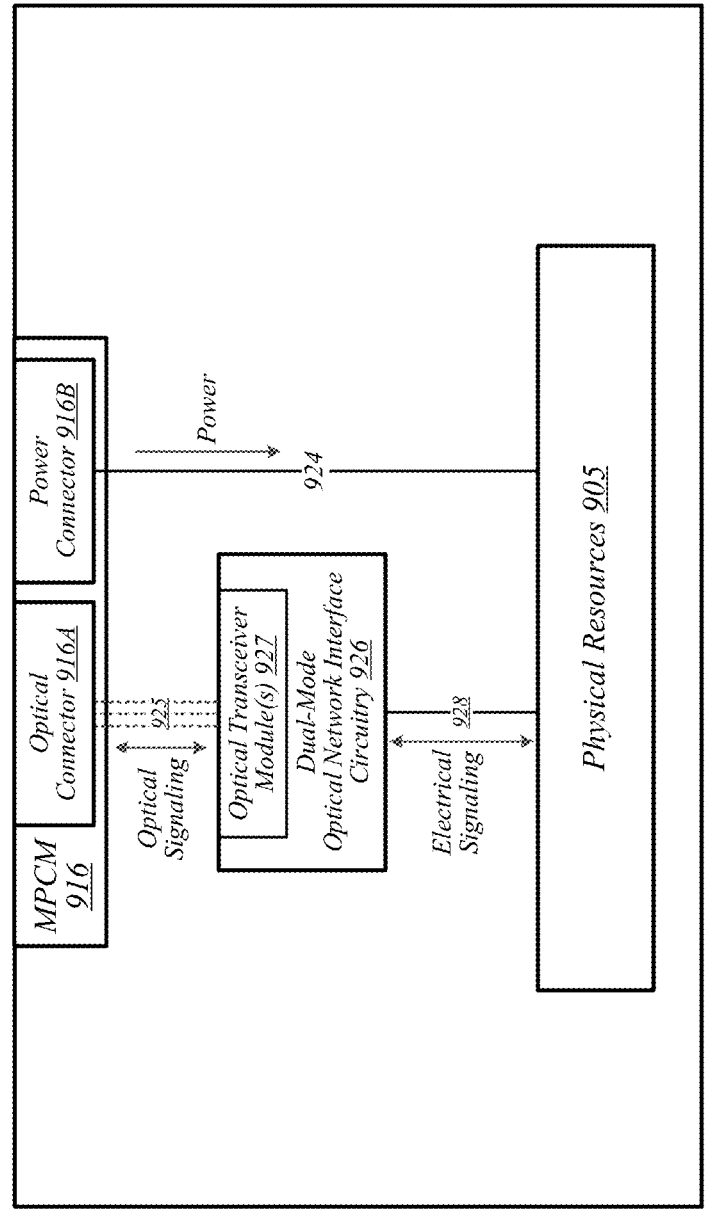
FIG. 9 illustrates a second example sled.

FIG. 9 illustrates an example of a sled 904 that may be representative of a sled designed for use in conjunction with rack 802 of FIG. 8 according to some embodiments. Sled 904 may feature an MPCM 916 that comprises an optical connector 916A and a power connector 916B, and that is designed to couple with a counterpart MPCM of a sled space in conjunction with insertion of MPCM 916 into that sled space. Coupling MPCM 916 with such a counterpart MPCM may cause power connector 916 to couple with a power connector comprised in the counterpart MPCM. This may generally enable physical resources 905 of sled 904 to source power from an external source, via power connector 916 and power transmission media 924 that conductively couples power connector 916 to physical resources 905.

Sled 904 may also include dual-mode optical network interface circuitry 926. Dual-mode optical network interface circuitry 926 may generally comprise circuitry that is capable of communicating over optical signaling media according to each of multiple link-layer protocols supported by dual-mode optical switching infrastructure 814 of FIG. 8. In some embodiments, dual-mode optical network interface circuitry 926 may be capable both of Ethernet protocol communications and of communications according to a second, high-performance protocol that offers significantly greater throughput and significantly reduced latency relative to Ethernet. In various embodiments, dual-mode optical network interface circuitry 926 may include one or more optical transceiver modules 927, each of which may be capable of transmitting and receiving optical signals over each of one or more optical channels. The embodiments are not limited in this context.

Coupling MPCM 916 with a counterpart MPCM of a sled space in a given rack may cause optical connector 916A to couple with an optical connector comprised in the counterpart MPCM. This may generally establish optical connectivity between optical cabling of the sled and dual-mode optical network interface circuitry 926, via each of a set of optical channels 925. Dual-mode optical network interface circuitry 926 may communicate with the physical resources 905 of sled 904 via electrical signaling media 928. In addition to the dimensions of the sleds and arrangement of components on the sleds to provide improved cooling and enable operation at a relatively higher thermal envelope (e.g., 250 Watts (W)), as described above with reference to FIG. 8, in some embodiments, a sled may include one or more additional features to facilitate air cooling, such as a heat pipe and/or heat sinks arranged to dissipate heat generated by physical resources 905. It is worthy of note that although the example sled 904 depicted in FIG. 9 does not feature an expansion connector, any given sled that features the design elements of sled 904 may also feature an expansion connector according to some embodiments.

Figure 10:
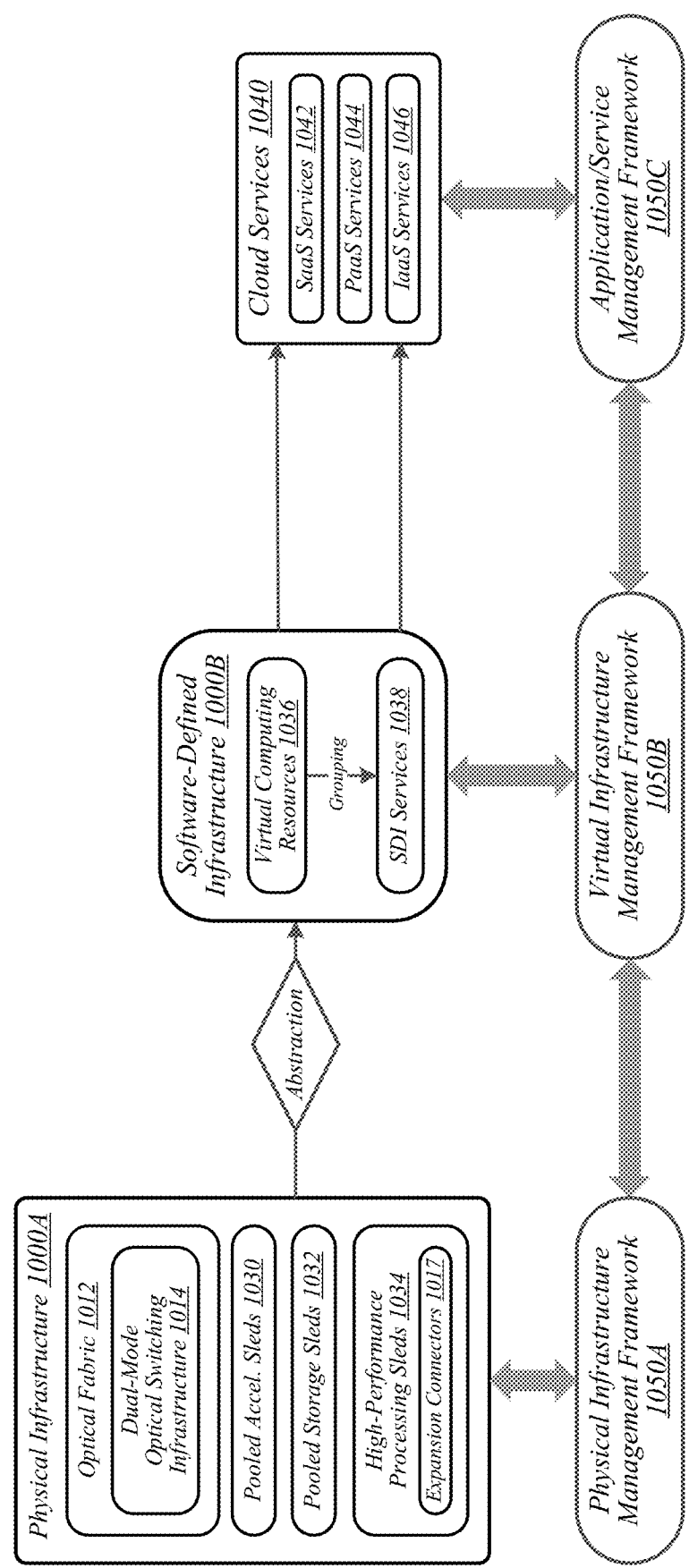
FIG. 10 illustrates a third example data center.

FIG. 10 illustrates an example of a data center 1000 that may generally be representative of one in/for which one or more techniques described herein may be implemented according to various embodiments. As reflected in this figure, a physical infrastructure management framework 1050A may be implemented to facilitate management of a physical infrastructure 1000A of data center 1000. In various embodiments, one function of physical infrastructure management framework 1050A may be to manage automated maintenance functions within data center 1000, such as the use of robotic maintenance equipment to service computing equipment within physical infrastructure 1000A. In some embodiments, physical infrastructure 1000A may feature an advanced telemetry system that performs telemetry reporting that is sufficiently robust to support remote automated management of physical infrastructure 1000A. In various embodiments, telemetry information provided by such an advanced telemetry system may support features such as failure prediction/prevention capabilities and capacity planning capabilities. In some embodiments, physical infrastructure management framework 1050A may also be configured to manage authentication of physical infrastructure components using hardware attestation techniques. For example, robots may verify the authenticity of components before installation by analyzing information collected from a radio frequency identification (RFID) tag associated with each component to be installed.

As depicted, the physical infrastructure 1000A of data center 1000 may comprise an optical fabric 1012, which may include a dual-mode optical switching infrastructure 1014. Optical fabric 1012 and dual-mode optical switching infrastructure 1014 may be the same as—or similar to—optical fabric 312 of FIG. 3 and dual-mode optical switching infrastructure 414 of FIG. 4, respectively, and may provide high-bandwidth, low-latency, multi-protocol connectivity among sleds of data center 1000. As discussed above, with reference to FIG. 1, in various embodiments, the availability of such connectivity may make it feasible to disaggregate and dynamically pool resources such as processors, accelerators, memory, and storage. In some embodiments, for example, one or more pooled accelerator sleds 1030 may be included among the physical infrastructure 1000A of data center 1000, each of which may comprise a pool of accelerator resources—such as co-processors and/or field-programmable gate arrays (FPGAs), for example—that is available globally accessible to other sleds via optical fabric 1012 and dual-mode optical switching infrastructure 1014.

In another example, in various embodiments, one or more pooled storage sleds 1032 may be included among the physical infrastructure 1000A of data center 1000, each of which may comprise a pool of storage resources that is available globally accessible to other sleds via optical fabric 1012 and dual-mode optical switching infrastructure 1014. In some embodiments, such pooled storage sleds 1032 may comprise pools of storage devices, such as, for example, solid-state drives (SSDs), hard disk drives, compact disk (CD) drives, digital video disk (DVD) drives, or some combination of storage devise, such as, a disk drive comprising both magnetic and solid-state storage media. In various embodiments, one or more high-performance processing sleds 1034 may be included among the physical infrastructure 1000A of data center 1000. In some embodiments, high-performance processing sleds 1034 may comprise pools of high-performance processors, as well as cooling features that enhance air cooling to yield a higher thermal envelope of up to 250 W or more. In various embodiments, any given high-performance processing sled 1034 may feature an expansion connector 1017 that can accept a far memory expansion sled, such that the far memory that is locally available to that high-performance processing sled 1034 is disaggregated from the processors and near memory comprised on that sled. In some embodiments, such a high-performance processing sled 1034 may be configured with far memory using an expansion sled that comprises a low-latency solid-state memory, such as, a solid-state drive, or memory modules (e.g., DIMMs) comprising solid-state memory. The optical infrastructure allows for compute resources on one sled to utilize remote accelerator/FPGA, memory, and/or storage resources that are disaggregated on a sled located on the same rack or any other rack in the data center. The remote resources can be located one switch jump away or two-switch jumps away in the spine-leaf network architecture described above with reference to FIG. 4. The embodiments are not limited in this context.

In various embodiments, one or more layers of abstraction may be applied to the physical resources of physical infrastructure 1000A in order to define a virtual infrastructure, such as a software-defined infrastructure 1000B. In some embodiments, virtual computing resources 1036 of software-defined infrastructure 1000B may be allocated to support the provision of cloud services 1040. In various embodiments, particular sets of virtual computing resources 1036 may be grouped for provision to cloud services 1040 in the form of software defined infrastructure (SDI) services 1038. Examples of cloud services 1040 may include—without limitation—software as a service (SaaS) services 1042, platform as a service (PaaS) services 1044, and infrastructure as a service (IaaS) services 1046.

In some embodiments, management of software-defined infrastructure 1000B may be conducted using a virtual infrastructure management framework 1050B. In various embodiments, virtual infrastructure management framework 1050B may be designed to implement workload fingerprinting techniques and/or machine-learning techniques in conjunction with managing allocation of virtual computing resources 1036 and/or SDI services 1038 to cloud services 1040. In some embodiments, virtual infrastructure management framework 1050B may use/consult telemetry data in conjunction with performing such resource allocation. In various embodiments, an application/service management framework 1050C may be implemented in order to provide quality of service (QoS) management capabilities for cloud services 1040.

In particular, the virtual infrastructure management framework 1050B can compose virtual computing platforms (sometimes referred to as virtual computing devices) from elements of physical infrastructure 1000A. Furthermore, with some examples, ones of pooled accelerator sleds 1030 can be dynamically allocated to such virtual computing platforms, for example, to support various ones of could services 1040. The embodiments are not limited in this context.

Figure 11:
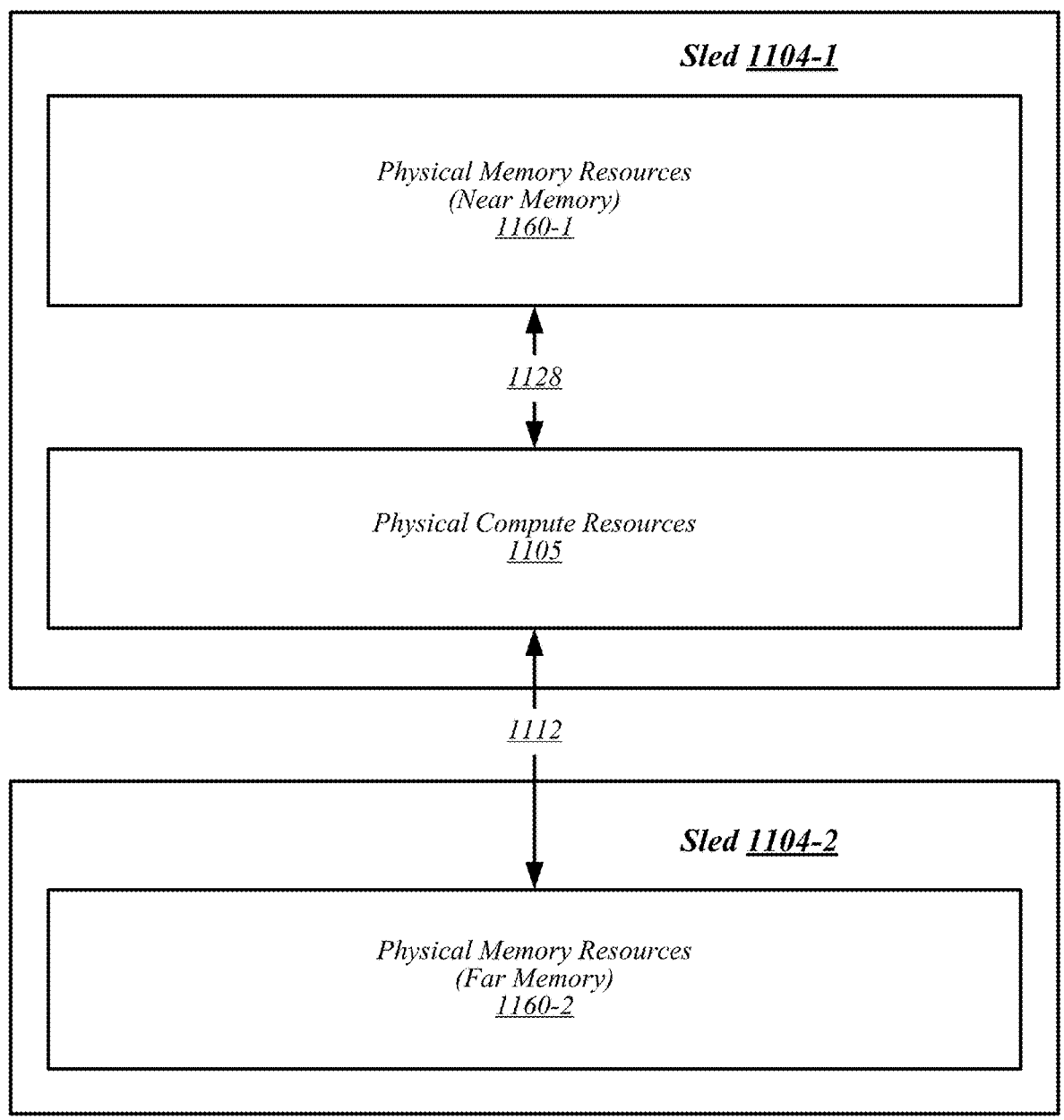
FIG. 11 illustrates a fourth example data center.

FIG. 11 illustrates an example data center 1100. In this illustrative example, data center 1100 comprises a number of sleds 1104 that each comprise a quantity of physical memory resources 1160. In general, physical memory resources 1160 can be any of a variety of computer readable memories including volatile memory and non-volatile memory For example, physical memory resources 1160 can be a volatile memory, which may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

As another example, physical memory resources 1160 can be non-volatile memory, which may be a storage medium that does not require power to maintain the stat of data stored by the medium. Non-limiting examples of non-volatile memory may include Embodiments may be applied to any memory device that comprise non-volatile memory. In one embodiment, the memory device is a block addressable memory device. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

In some embodiments, 3D crosspoint memory may comprise a transistor-less stackable cross point architecture in which memory cells sit at the intersection of word lines and bit lines and are individually addressable and in which bit storage is based on a change in bulk resistance.

Data center 1100 is depicted including sleds 1104-1 and 1104-2 where sled 1104-1 includes physical memory resources 1160-1 and sled 1104-2 includes physical memory resources 1160-2. Furthermore, sled 1104-1 includes physical compute resources 1105. The physical compute resources 1105 of sled 1104-1 are coupled to both physical memory resources 1160-1 of sled 1104-1 and physical memory resources 1160-2 of sled 1104-2. In this manner, physical compute resources 1105 can utilize (e.g., read, write, or the like) the memory of physical memory resources 1160-1 and 1160-2. It is noted, that although sled 1104-1 is depicted including physical compute resources 1105, sled 1104-1 could include physical accelerator resources, or the like. Examples are not limited in this context. However, the illustrative examples depicted in FIG. 11 to FIG. 15 depict sleds housing physical compute resources coupled to disaggregated memory resources for purposes of clarity of presentation only.

In some examples, physical compute resources 1105 can be coupled to physical memory resources 1160-1 via a local interface 1128. Local interface 1128 can be implemented according to double-data rate fourth generation (DDR4) synchronous dynamic random-access memory (SDRAM) Specification, Rev. A, published in November 2013. In some examples, physical compute resources 1105 can be coupled to physical memory resources 1160-2 via a fabric interface 1112. Fabric interface 1112 can be like—optical fabric 412 of FIG. 4.

As illustrated, physical memory resources 1160-1 are coupled to physical compute resources 1105 via local interface 1128 while physical memory resources 1160-2 are coupled to physical compute resources 1105 via fabric interface 1112. Thus, it may be said that physical memory resources 1160-1 are "near memory" resources while physical memory resources 1160-2 are "far memory" resources. As stated above, the terms "near" and "far" may not imply a physical or geographic distance between the memories and the compute resources. Instead, the terms "near" and "far" are intended to imply a speed, latency, bandwidth, or the like of the memory resources. For example, near memory (e.g., memory 1160-1) can be faster (e.g., lower latency, greater operating frequency, higher bandwidth, or the like) than far memory (e.g., memory 1160-2). In some examples, near memory 1160-1 may be faster than far memory 1160-2 due to the type of memories (e.g., near memory 1160-1 can be a different type of memory than far memory 1160-2) or due to the interconnects 1128 and 1112. Examples are not limited in these contexts. For example, in some implementations, near memory 1160-1 can be volatile memory while far memory 1160-2 can be non-volatile memory such as byte-addressable write-in place non-volatile memory.

Figure 12:
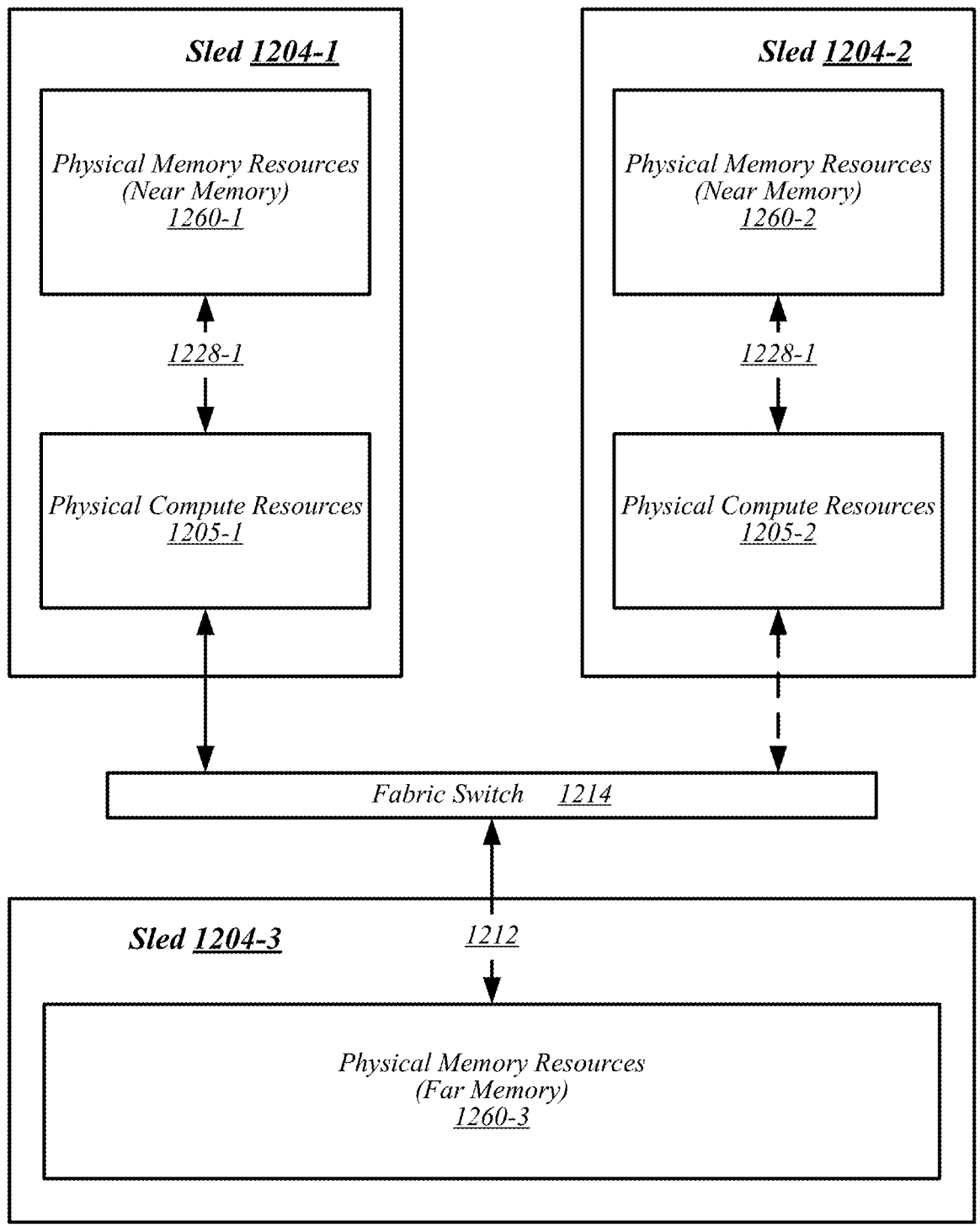
FIG. 12 illustrates a fifth example data center.

FIG. 12 illustrates an example data center 1200. In general, data center 1200 depicts a number of sleds that share or access far memory housed on a single sled. In particular, this illustrative example depicts data center 1200 having a number of sleds 1204 that each comprise a quantity of physical memory resources 1260. In general, physical memory resources 1260 can be any of a variety of computer readable memories. For example, physical resource memory 1260 can be random-access memory (RAM), dynamic RAM (DRAM), synchronous DRAM (SDRAM), double-data rate SDRAM, NAND memory, NOR memory, 3-Dimensional cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like. Examples are not limited in this context.

In particular, data center 1200 is depicted including sleds 1204-1, 1204-2 and 1204-3. Sleds 1204-1 and 1204-2 each include physical memory resources and compute resources while sled 1204-3 includes physical memory resources. In particular, sled 1204-1 includes physical compute resources 1205-1 and near memory resources 1260-1 for physical compute resources 1205-1 while sled 1204-2 includes physical compute resources 1205-2 and near memory resources 1260-2 for physical compute resources 1205-2. Sled 1204-3 includes far memory resources for both physical compute resources 1205-1 and 1205-2.

Physical compute resources 1205-1 and 1205-2 are coupled to physical memory resources 1260-1 and 1260-2, respectively, via local interfaces 1228-1 and 1228-2, respectively. Local interfaces 1228-1 and 1228-2 can be implemented according to the Peripheral Component Interconnect (PCI) Express Base Specification, revision 3.1a, published in December 2015 ("PCI Express specification" or "PCIe specification"), the Non-Volatile Memory Express (NVMe) Specification, revision 1.2a, published in October 2015 ("NVM Express specification" or "NVMe specification"), or the PCIe Generation 4 Specification to be released in 2017.

Physical compute resources 1205-1 and 1205-2 are coupled to physical memory resources 1260-3 via a fabric interface 1212 and fabric switch 1214 (e.g., like fabric 412 and fabric switch 414 of FIG. 4). Thus, it may be said that physical memory resources 1260-1 and 1260-2 are "near memory" resources to respective compute resources 1205-1 and 1205-2 while physical memory resources 1260-3 is "far memory" resources to the compute resource 1205-1. In some examples, near memories 1260-1 and 1260-2 can be volatile memory while far memory 1260-3 can be non-volatile memory such as byte-addressable write-in place non-volatile memory.

Figure 13:
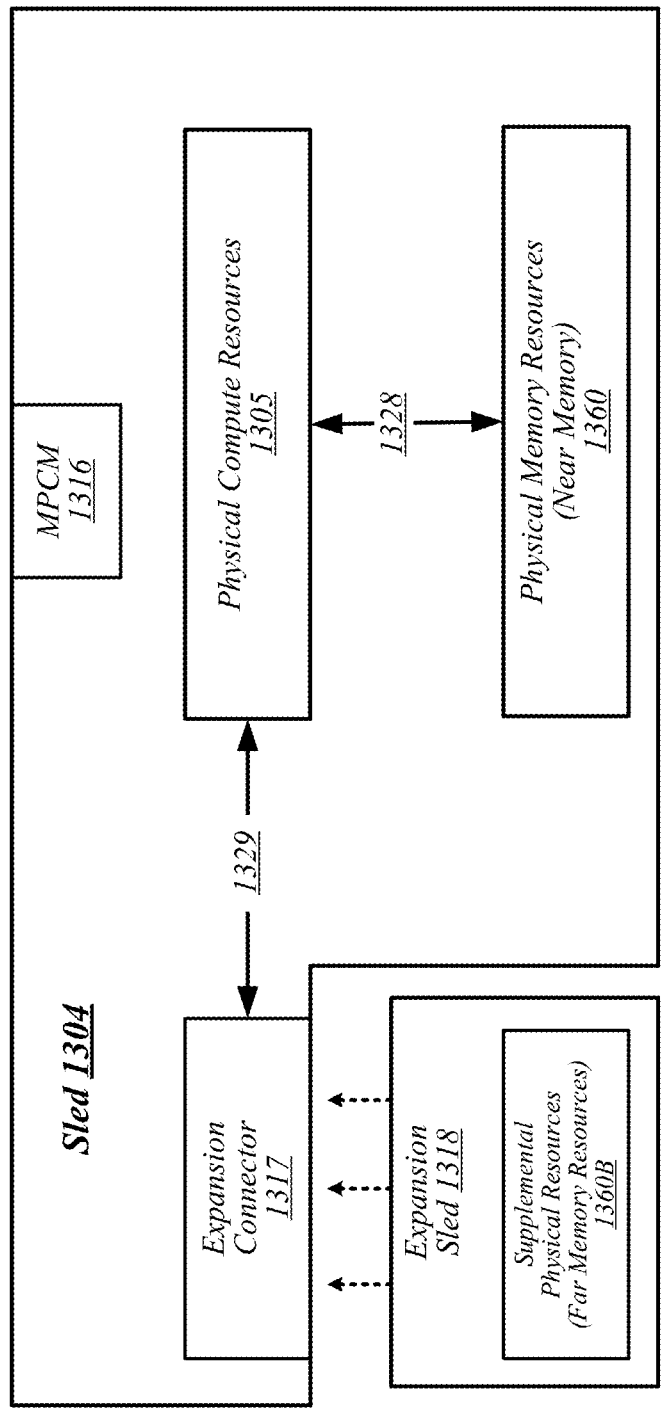
FIG. 13 illustrates a third example sled.

FIG. 13 illustrates an example of a sled 1304 that may be representative of a sled comprising compute resources as well as near and far memory. As shown in this figure, sled 1304 may comprise a set of physical compute resources 1305, as well as an MPCM 1316 designed to couple with a counterpart MPCM when sled 1304 is inserted into a sled space, such as any of sled spaces 503-1 to 503-5 of FIG. 5. Sleds 1304 can comprise a quantity of physical memory resources 1360.

Sled 1304 may also feature an expansion connector 1317. Expansion connector 1317 may generally comprise a socket, slot, or other type of connection element that is capable of accepting one or more types of expansion modules, such as an expansion sled 1318. By coupling with a counterpart connector on expansion sled 1318, expansion connector 1317 may provide physical compute resources 1305 with access to supplemental physical memory resources 1360B residing on expansion sled 1318.

In general, physical memory resources 1360 and 1360B can be any of a variety of computer readable memories. For example, physical resource memory 1360 and 1360B can be random-access memory (RAM), dynamic RAM (DRAM), synchronous DRAM (SDRAM), double-data rate SDRAM, NAND memory, NOR memory, 3-Dimensional cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like. Examples are not limited in this context.

Physical compute resources 1305 can be coupled to physical memory resources 1360 (e.g., near memory) via local interface 1328. Local interface 1128 can be implemented according to double-data rate fourth generation (DDR4) synchronous dynamic random-access memory (SDRAM) Specification, Rev. A, published in November 2013.

Additionally, physical compute resources 1305 can be coupled to physical memory resources 1360 (e.g., far memory) via expansion interface 1329. Expansion interface 1329 can be implemented according to the Peripheral Component Interconnect (PCI) Express Base Specification, revision 3.1a, published in December 2015 ("PCI Express specification" or "PCIe specification"), the PCIe Generation 4 Specification to be released in 2017, UPI interconnect, or a proprietary interface.

Figure 14:
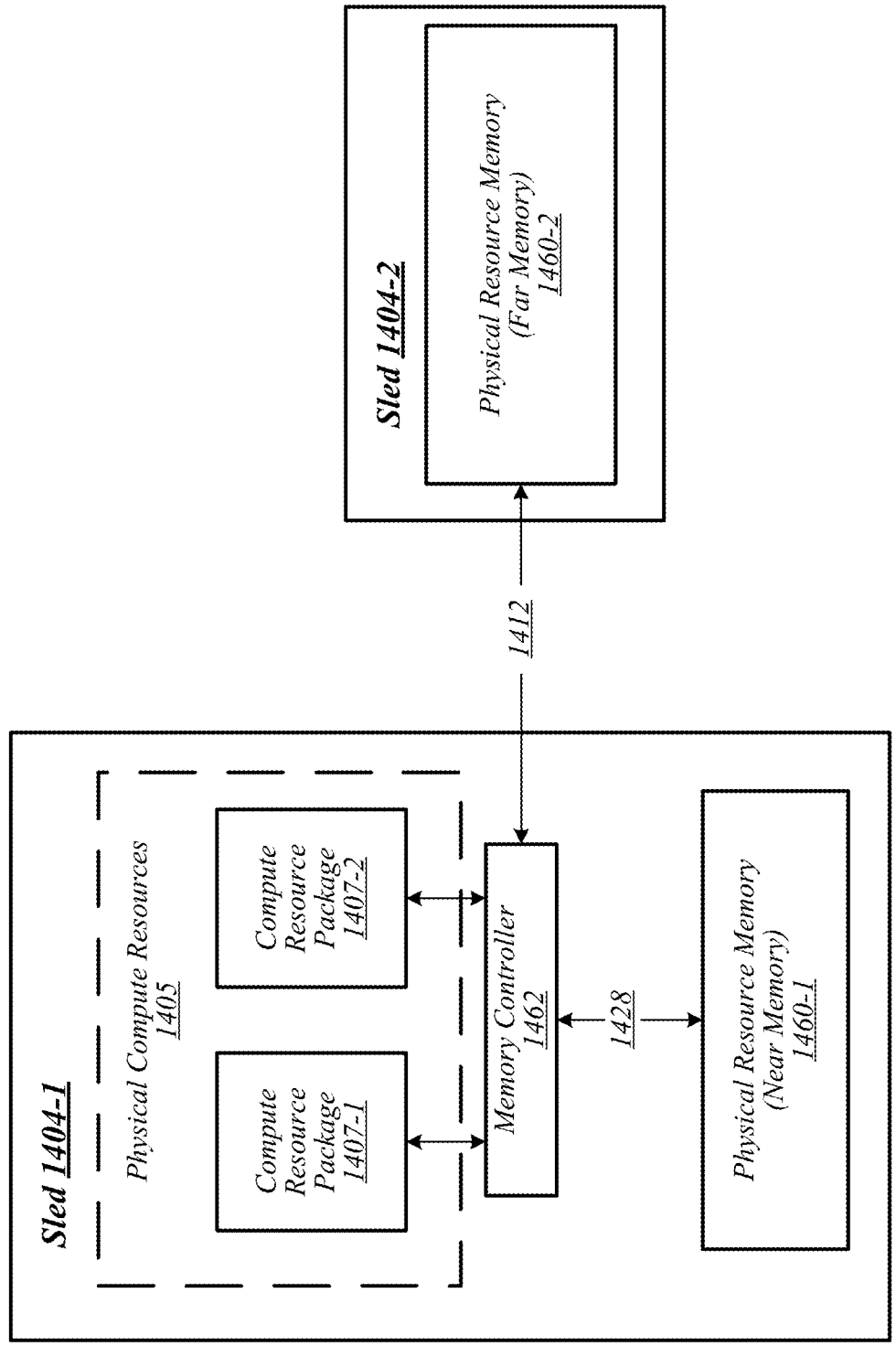
FIG. 14 illustrates a sixth example data center.

FIG. 14 illustrates an example data center 1400. In this illustrative example, data center 1400 comprises a number of sleds 1404 that each comprise a quantity of physical memory resources 1460. In general, physical memory resources 1460 can be any of a variety of computer readable memories. For example, physical resource memory 1460 can be random-access memory (RAM), dynamic RAM (DRAM), synchronous DRAM (SDRAM), double-data rate SDRAM, NAND memory, NOR memory, 3-Dimensional cross-point memory, ferroelectric memory, silicon-oxide-nitride-oxide-silicon (SONOS) memory, polymer memory such as ferroelectric polymer memory, ferroelectric transistor random access memory (FeTRAM or FeRAM), nanowire, phase change memory, magnetoresistive random access memory (MRAM), spin transfer torque MRAM (STT-MRAM) memory, or the like. Examples are not limited in this context.

In particular, data center 1400 is depicted including sleds 1404-1 and 1404-2 where sled 1404-1 includes near memory resources 1460-1 and sled 1404-2 includes far memory resources 1460-2. Furthermore, sled 1404-1 includes a set of physical compute resources 1405. In this illustrative example, the set of physical compute resources 1405 includes compute resource packages 1407-1 and 1407-2. In general, compute resources packages 1407-1 and 1407-2 can be any compute resource package, such as, for example, a central processing unit, or the like.

Sled 1404-1 further includes a memory controller 1462 to couple the compute resources packages 1407-1 and 1407-2 to the near memory 1460-1 and the far memory 1460-2. Memory controller 1462 can be configured to manage access to memories 1460-1 and 1460-2.

In some examples, memory controller 1462 can be coupled to physical memory resources 1460-1 via a local interface 1428. Local interface 1128 can be implemented according to double-data rate fourth generation (DDR4) synchronous dynamic random-access memory (SDRAM) Specification, Rev. A, published in November 2013. In some examples, memory controller 1462 can be coupled to physical memory resources 1160-2 via a fabric interface 1412. Fabric interface 1412 can be like—optical fabric 412 of FIG. 4.

Figure 15:
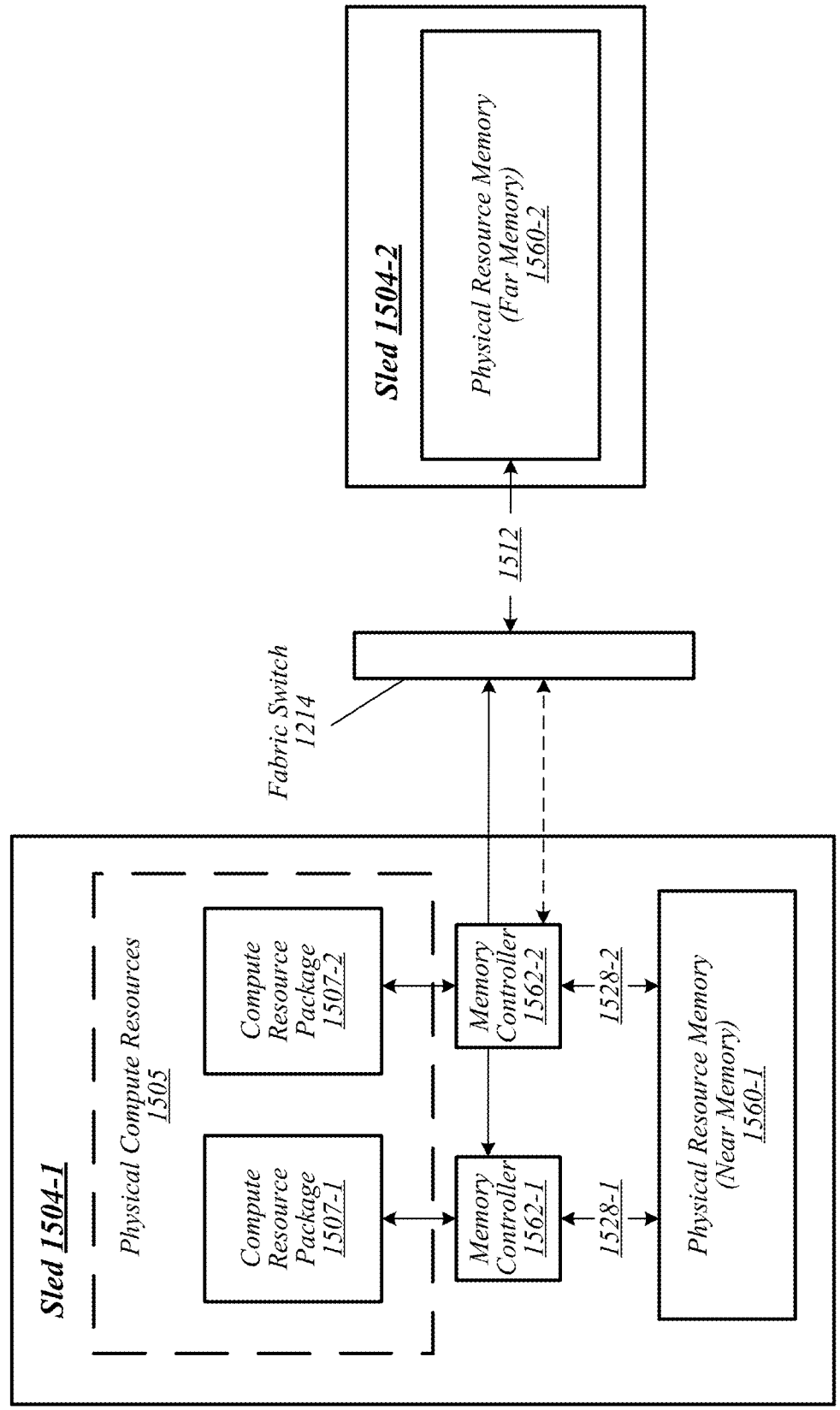
FIG. 15 illustrates a seventh example data center.

In some examples, each compute resource package can have an individual memory controller. For example, FIG. 15 depicts an illustrative data center 1500 including physical compute resources 1505 on sled 1504-1. Physical compute resources 1505 include compute resource packages 1507-1 and 1507-2. Compute resources packages 1507-1 and 1507-2 are coupled to near memory resources 1560-1 via memory controllers 1562-1 and 1562-2 and local interconnects 1528-1 and 1528-2, respectively. Additionally, compute resources packages 1507-1 and 1507-2 are coupled to far memory resources 1560-2 of sled 1504-2 via memory controllers 1562-1 and 1562-2 and fabric interconnect 1512 and fabric switch 1514, respectively.

It is noted, in some examples, memory controllers 1562-1 and 1562-2 can be external to compute resources packages 1507-1 and 1507-2. In other examples (not depicted) memory controllers 1562-1 and 1562-2 can be integrated into respective compute resource packages 1507-1 and 1507-2. Examples are not limited in this context.

Figure 16:
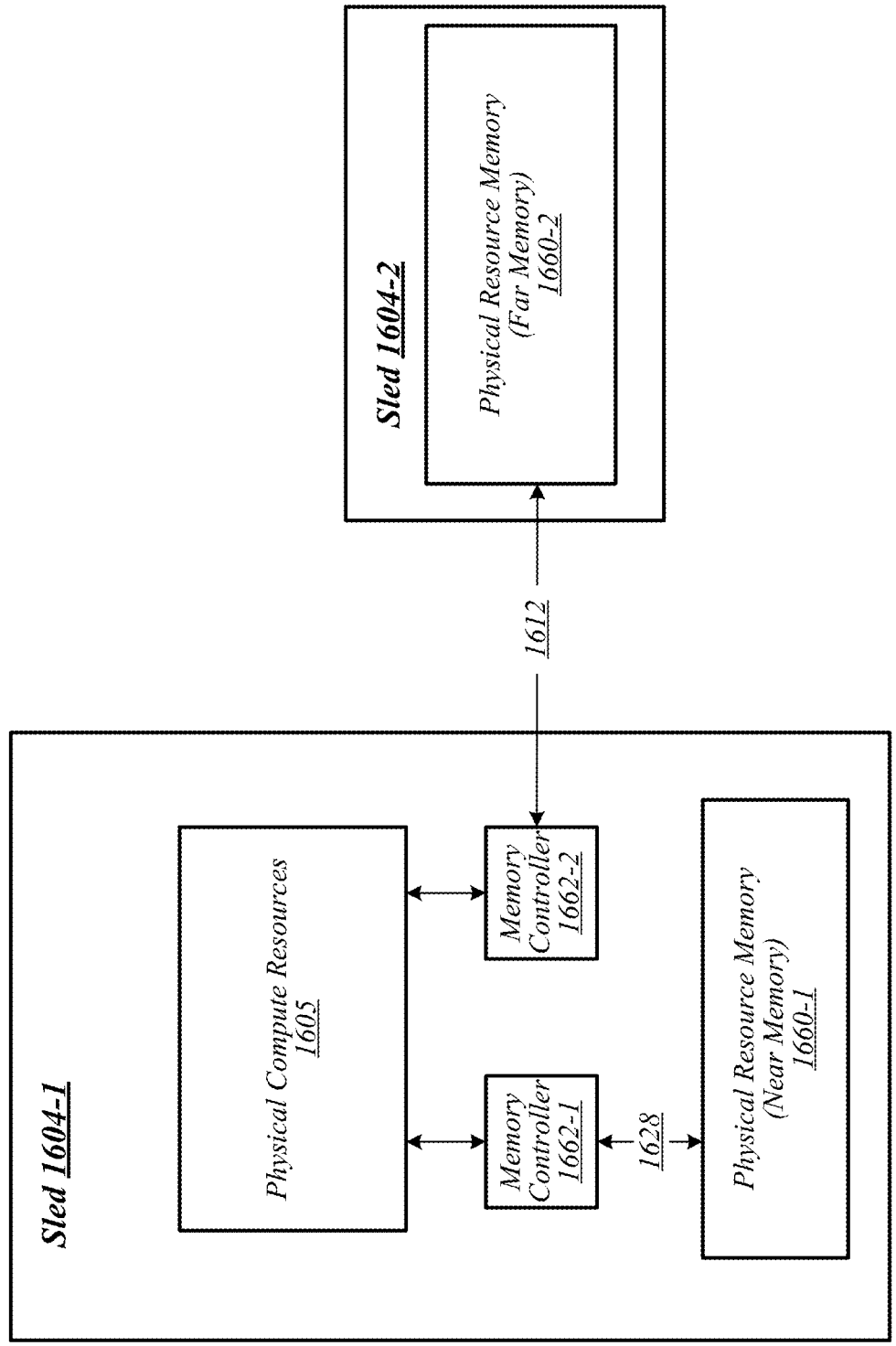
FIG. 16 illustrates an eight example data center.

In some examples, multiple memory controllers can be provided, for example, different memory controllers for far and near memories. FIG. 16 depicts an illustrative data center 1600 including physical compute resources 1605 on sled 1604-1. Physical compute resources 1605 are coupled to near memory resources 1660-1 via memory controller 1662-1 and local interconnect 1628. Additionally, physical compute resources 1605 are coupled to far memory resources 1660-2 of sled 1604-2 via memory controller 1662-2 and fabric interconnect 1612.

Figure 17:
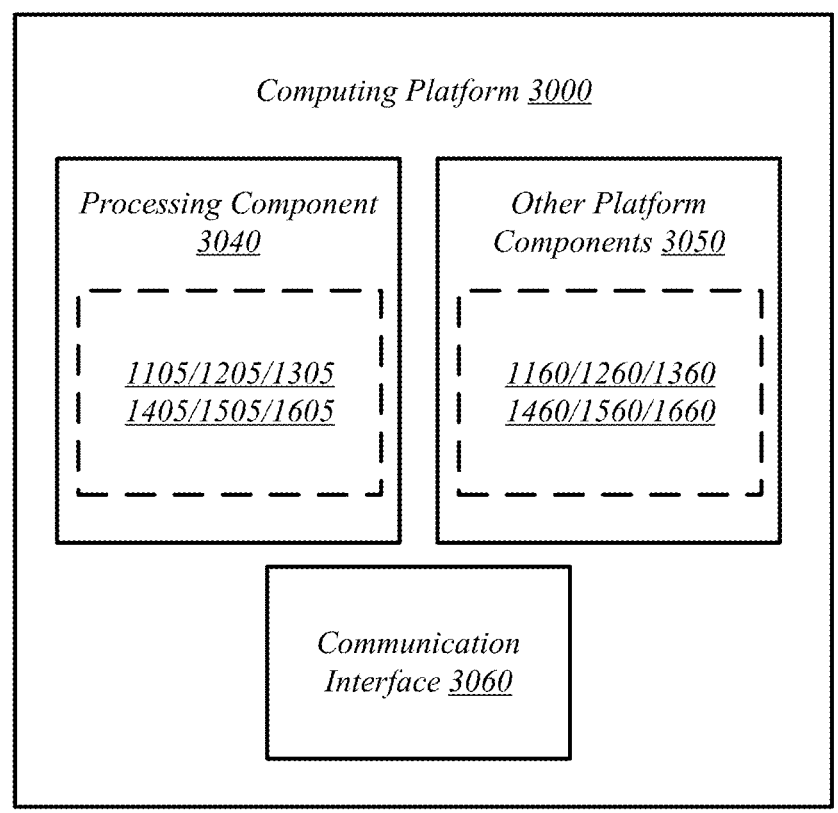
FIG. 17 illustrates an example computing platform.

FIG. 17 illustrates an example computing platform 3000. In some examples, as shown in this figure, computing platform 3000 may include a processing component 3040, other platform components or a communications interface 3060. According to some examples, computing platform 3000 may be implemented in a computing device such as a server in a system such as a data center or server farm that supports a manager or controller for managing configurable computing resources as mentioned above.

According to some examples, processing component 3040 may include hardware or logic for apparatus described herein, such as, physical compute resources (e.g., 1105, 1205, 1305, 1405, 1505, 1605, or the like). Processing component 3040 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 3050 may include common computing elements, such as one or more processors, multi-core processors, co-processors, memory units (e.g., near and far memory (e.g., 1160, 1260, 1360, 1460, 1560, 1660, or the like)), chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 3060 may include logic and/or features to support a communication interface. For these examples, communications interface 3060 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 3000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 3000 described herein, may be included or omitted in various embodiments of computing platform 3000, as suitably desired.

The components and features of computing platform 3000 may be implemented using any combination of discrete circuitry, ASICs, logic gates and/or single chip architectures. Further, the features of computing platform 3000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 3000 shown in the block diagram of this figure may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASICs), programmable logic devices (PLDs), digital signal processors (DSPs), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1

A system for a data center comprising: a rack comprising a plurality of sled spaces; and a first sled coupled to the rack via a first one of the plurality of sled spaces, the first sled comprising: at least one physical compute resource; a first set of physical memory resources coupled to the at least one physical compute resource; and a first fabric interface; and a second sled coupled to the rack via a second one of the plurality of sled spaces, the second sled comprising: a second set of physical memory resources; and a second fabric interface to couple the second set of physical memory resources to the at least one physical compute resource via a fabric and the first fabric interface.

Example 2

The system of example 1, the first set of physical memory resources comprising volatile memory.

Example 3

The system of example 2, the second set of physical memory resources comprising byte-addressable write-in place non-volatile memory.

Example 4

The system of example 1, the at least one physical compute resource comprising a central processing unit, a field programmable gate array, a graphics processing unit, or an application specific integrated circuit.

Example 5

The system of example 1, the first sled comprising a first memory controller to couple the at least one physical compute resource to at least one of the first set of physical memory resources or the second set of physical memory resources.

Example 6

The system of example 5, the first sled comprising a second memory controller, the first memory controller to couple the at least one physical compute resource to the first set of physical memory resources and the second memory controller to couple the at least one physical compute resource to the second set of physical memory resources.

Example 7

The system of example 1, the at least one physical compute resource coupled to the first set of physical memory resources via a local interface, the local interface a peripheral component interconnect express compliant standard.

Example 8

The system of example 1, the fabric an optical fabric.

Example 9

An apparatus for a compute resource sled, comprising: at least one physical compute resource; a first set of physical memory resources coupled to the at least one physical compute resource; and a first fabric interface, the first fabric interface to couple the at least one physical compute resource to a second set of physical memory resources via a fabric.

Example 10

The apparatus of example 9, the first set of physical memory resources comprising volatile memory.

Example 11

The apparatus of example 10, the second set of physical memory resources comprising byte-addressable write-in place non-volatile memory.

Example 12

The apparatus of example 9, the at least one physical compute resource comprising a central processing unit, a field programmable gate array, a graphics processing unit, or an application specific integrated circuit.

Example 13

The apparatus of example 9, comprising a first memory controller to couple the at least one physical compute resource to at least one of the first set of physical memory resources or the second set of physical memory resources.

Example 14

The apparatus of example 13, comprising a second memory controller, the first memory controller to couple the at least one physical compute resource to the first set of physical memory resources and the second memory controller to couple the at least one physical compute resource to the second set of physical memory resources.

Example 15

The apparatus of example 9, the at least one physical compute resource coupled to the first set of physical memory resources via a local interface, the local interface a peripheral component interconnect express compliant standard.

Example 16

The apparatus of example 9, the fabric an optical fabric.

Example 17

A method comprising: coupling at least one physical compute resource to a first set of physical memory resources, the at least one physical compute resource and the first set of physical memory resources housed in a first sled of a data center; and coupling, via a fabric, the at least one physical compute resource to a second set of physical memory resources, the second set of physical memory resources housed in a second sled of the data center.

Example 18

The method of example 17, the first set of physical memory resources comprising volatile memory.

Example 19

The method of example 18, the second set of physical memory resources comprising byte-addressable write-in place non-volatile memory.

Example 20

The method of example 17, the at least one physical compute resource comprising a central processing unit, a field programmable gate array, a graphics processing unit, or an application specific integrated circuit.

Example 21

The method of example 17, comprising coupling the at least one physical compute resource to the first set of physical memory resources via a first memory controller.

Example 22

The method of example 21, comprising coupling the at least one physical compute resource to the first set of physical memory resources via a local interface, the local interface a peripheral component interconnect express compliant standard.

Example 23

The method of example 17, comprising coupling the at least one physical compute resource to the second set of physical memory resources via a second memory controller.

Example 24

The method of example 17, the fabric an optical fabric.

Example 25

An apparatus comprising means to implement the method of any one of examples 17 to 24.

Example 26

A computer-readable medium comprising instructions that when executed by a processor of a data center infrastructure manager cause the processor to implement the method of any one of examples 17 to 24.

Example 27

At least one non-transitory machine readable medium comprising a plurality of instructions that in response to being executed by a processor of a virtual infrastructure management framework of a data center cause the virtual infrastructure management framework to: couple at least one physical compute resource to a first set of physical memory resources, the at least one physical compute resource and the first set of physical memory resources housed in a first sled of a data center; and couple, via a fabric, the at least one physical compute resource to a second set of physical memory resources, the second set of physical memory resources housed in a second sled of the data center.

Example 28

The at least one non-transitory machine readable medium of example 27, the first set of physical memory resources comprising volatile memory.

Example 29

The at least one non-transitory machine readable medium of example 28, the second set of physical memory resources comprising byte-addressable write-in place non-volatile memory.

Example 30

The at least one non-transitory machine readable medium of example 27, the at least one physical compute resource comprising a central processing unit, a field programmable gate array, a graphics processing unit, or an application specific integrated circuit.

Example 31

The at least one non-transitory machine readable medium of example 27, comprising instructions that in response to being executed by the processor of the virtual infrastructure management framework cause the virtual infrastructure management framework to couple the at least one physical compute resource to the first set of physical memory resources via a first memory controller.

Example 32

The at least one non-transitory machine readable medium of example 31, comprising instructions that in response to being executed by the processor of the virtual infrastructure management framework cause the virtual infrastructure management framework to couple the at least one physical compute resource to the first set of physical memory resources via a local interface, the local interface a peripheral component interconnect express compliant standard.

Example 33

The at least one non-transitory machine readable medium of example 27, comprising instructions that in response to being executed by the processor of the virtual infrastructure management framework cause the virtual infrastructure management framework to couple the at least one physical compute resource to the second set of physical memory resources via a second memory controller.

Example 34

The at least one non-transitory machine readable medium of example 27, the fabric an optical fabric.

The invention claimed is:

1. A system for a data center comprising:
a rack comprising a plurality of sled spaces; and
a first sled coupled to the rack via a first one of the plurality of sled spaces, the first sled comprising:
at least one physical compute resource;
a first set of physical memory resources;
a local interface;
a first memory controller to couple the at least one physical compute resource to the first set of physical memory resources via the local interface;
a first fabric interface; and
a second memory controller to couple the at least one physical compute resource to a second set of physical memory resources via the first fabric interface;
a second sled coupled to the rack via a second one of the plurality of sled spaces, the second sled comprising:
the second set of physical memory resources, the second set of physical memory resources comprising byte-addressable write-in place non-volatile memory; and
a second fabric interface to couple the second set of physical memory resources to the at least one physical compute resource via a fabric, the first fabric interface, and the second memory controller.

2. The system of claim 1, the first set of physical memory resources comprising volatile memory.

3. The system of claim 1, the at least one physical compute resource comprising a central processing unit, a field programmable gate array, a graphics processing unit, or an application specific integrated circuit.

4. The system of claim 1, the local interface a peripheral component interconnect express compliant standard.

5. The system of claim 1, the fabric an optical fabric.

6. The system of claim 1, wherein the local interface has lower latency than the fabric, greater bandwidth than the fabric, or both lower latency and greater bandwidth than the fabric.

7. The system of claim 1, the at least one physical compute resource comprising a first physical compute resource and a second physical compute resource, the first memory controller to couple the first physical compute resource to the first set of physical memory resources via the local interface and to couple the first physical compute resource to the second set of physical memory resources via the first fabric interface, the second memory controller to couple the second physical compute resource to the second set of physical memory resources via the first fabric interface and to couple the second physical compute resource to the first set of physical memory resources via the local interface.

8. An apparatus for a compute resource sled, comprising:
at least one physical compute resource;
a first set of physical memory resources;
a local interface;
a first memory controller to couple the at least one physical compute resource to the first set of physical memory resources via the local interface;
a first fabric interface; and
a second memory controller to couple the at least one physical compute resource to a second set of physical memory resources via a fabric and the first fabric interface, the second set of physical memory resources comprising byte-addressable write-in place non-volatile memory.

9. The apparatus of claim 8, the first set of physical memory resources comprising volatile memory.

10. The apparatus of claim 8, the at least one physical compute resource comprising a central processing unit, a field programmable gate array, a graphics processing unit, or an application specific integrated circuit.

11. The apparatus of claim 8, the local interface a peripheral component interconnect express compliant standard.

12. The apparatus of claim 8, the fabric an optical fabric.

13. The apparatus of claim 8, wherein the local interface has lower latency than the fabric, greater bandwidth than the fabric, or both lower latency and greater bandwidth than the fabric.

14. The apparatus of claim 8, the at least one physical compute resource comprising a first physical compute resource and a second physical compute resource, the first memory controller to couple the first physical compute resource to the first set of physical memory resources via the local interface and to couple the first physical compute resource to the second set of physical memory resources via the first fabric interface, the second memory controller to couple the second physical compute resource to the second set of physical memory resources via the first fabric interface and to couple the second physical compute resource to the first set of physical memory resources via the local interface.

15. A method comprising:
coupling, via a first memory controller and a local interface, at least one physical compute resource to a first set of physical memory resources, the at least one physical compute resource and the first set of physical memory resources housed in a first sled of a data center; and
coupling, via a second memory controller and a fabric, the at least one physical compute resource to a second set of physical memory resources, the second set of physical memory resources housed in a second sled of the data center, the second set of physical memory resources comprising byte-addressable write-in place non-volatile memory.

16. The method of claim 15, the first set of physical memory resources comprising volatile memory.

17. The method of claim 15, the at least one physical compute resource comprising a central processing unit, a field programmable gate array, a graphics processing unit, or an application specific integrated circuit.

18. The method of claim 15, the local interface a peripheral component interconnect express compliant standard.

19. The method of claim 15, the fabric an optical fabric.

20. The method of claim 15, wherein the local interface has lower latency than the fabric, greater bandwidth than the fabric, or both lower latency and greater bandwidth than the fabric.

21. The method of claim 15, the at least one physical compute resource comprising a first physical compute resource and a second physical compute resource, the method comprising:
coupling, via the first memory controller and the local interface, the first physical compute resource to the first set of physical memory resources;
coupling, via the first memory controller and the fabric, the first physical compute resource to the second set of physical memory resources;
coupling, via the second memory controller and the local interface, the second physical compute resource to the first set of physical memory resources; and
coupling, via the second memory controller and the fabric, the second physical compute resource to the second set of physical memory resources.

* * * * *